US012170884B2

(12) United States Patent
Fujii et al.

(10) Patent No.: US 12,170,884 B2
(45) Date of Patent: Dec. 17, 2024

(54) PROCESSING DEVICE AND PROCESSING METHOD

(71) Applicant: JVCKENWOOD Corporation, Yokohama (JP)

(72) Inventors: Yumi Fujii, Yokohama (JP); Hisako Murata, Yokohama (JP); Takahiro Gejo, Yokohama (JP); Kuniaki Takachi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 144 days.

(21) Appl. No.: 17/859,430

(22) Filed: Jul. 7, 2022

(65) Prior Publication Data

US 2023/0040821 A1 Feb. 9, 2023

(30) Foreign Application Priority Data

Aug. 6, 2021 (JP) ................................. 2021-130085
Aug. 6, 2021 (JP) ................................. 2021-130087

(51) Int. Cl.

| | |
|---|---|
| ***H04R 3/04*** | (2006.01) |
| ***H04R 3/00*** | (2006.01) |
| ***H04R 5/027*** | (2006.01) |
| ***H04R 5/04*** | (2006.01) |
| ***H04S 1/00*** | (2006.01) |
| ***H04S 7/00*** | (2006.01) |

(52) U.S. Cl.

CPC ............. *H04S 7/307* (2013.01); *H04R 3/005* (2013.01); *H04R 3/04* (2013.01); *H04R 5/027* (2013.01); *H04R 5/04* (2013.01); *H04S 1/007* (2013.01); *H04S 2400/15* (2013.01)

(58) Field of Classification Search

CPC .................................................. H04S 2400/15
See application file for complete search history.

(56) References Cited

U.S. PATENT DOCUMENTS

| | | | | |
|---|---|---|---|---|
| 2014/0044273 | A1 * | 2/2014 | Hashimoto | H04R 3/02 381/66 |
| 2017/0339504 | A1 * | 11/2017 | Bharitkar | H04S 3/004 |
| 2020/0213802 | A1 | 7/2020 | Takachi et al. | |
| 2023/0164509 | A1 * | 5/2023 | Sporer | H04S 3/008 381/309 |
| 2023/0199419 | A1 * | 6/2023 | Hatab | H04R 5/04 381/303 |

FOREIGN PATENT DOCUMENTS

JP 2019062430 A 4/2019

* cited by examiner

*Primary Examiner* — Ping Lee
(74) *Attorney, Agent, or Firm* — Procopio, Cory, Hargreaves & Savitch LLP

(57) ABSTRACT

A processing device according to an embodiment includes: a frequency characteristics acquisition unit configured to acquire frequency characteristics of at least one sound pickup signal; a smoothing processing unit configured to perform smoothing processing so as to generate second spectral data smoother than first spectral data based on the frequency characteristics; a first compression unit configured to calculate a first difference value corresponding to a difference between the second spectral data and the first spectral data in a first band, and to compress the second spectral data based on the first difference value; and a filter generation unit configured to generate a filter, based on the second spectral data.

8 Claims, 17 Drawing Sheets

Fig. 12
who_hrs.dorg/who_hrs.d
length=4096
[dB]
Freq Domain (Amplitude)
0.00 [ Hz] -42.23 [dB]
0.00 [ Hz] -40.72 [dB]
$A_{lrc2}$
10
0
-10
-20
-30
-40
10
20
30
50
100
200
300
500
1k
2k
3k
5k
10k
20k
[Hz]

PROCESSING DEVICE AND PROCESSING METHOD

CROSS REFERENCE TO RELATED APPLICATION

This application is based upon and claims the benefit of priority from Japanese patent application No. 2021-130085, filed on Aug. 6, 2021 and Japanese patent application No. 2021-130087, filed on Aug. 6, 2021, the disclosure of which is incorporated herein in its entirety by reference.

BACKGROUND

The present disclosure relates to a processing device and a processing method.

Sound localization techniques include an out-of-head localization technique, which localizes sound images outside the head of a listener by using headphones. The out-of-head localization technique works to cancels characteristics from headphones to the ears (headphone characteristics), and gives two characteristics from one speaker (monaural speaker) to the ears (spatial acoustic transfer characteristics). This localizes the sound images outside the head.

In out-of-head localization reproduction with a stereo speaker, measurement signals (impulse sounds etc.) that are output from 2-channel (which is referred to hereinafter as "ch") speakers are recorded by microphones (which can be also called "mike") placed on the listener's ears. Then, the processing device generates a filter based on a sound pickup signal obtained by picking up the measurement signal. The generated filter is convolved to 2 ch audio signals, thereby implementing out-of-head localization reproduction.

In addition, to generate a filter to cancel headphone-to-ear characteristics, which is called an inverse filter, characteristics from the headphones to a vicinity of the ear or the eardrum (also referred to as ear canal transfer function ECTF, or ear canal transfer characteristics) are measured with a microphone placed in the listener's ear.

Patent Literature 1 (Japanese Unexamined Patent Application Publication No. 2019-62430) discloses a device for performing out-of-head localization processing. Further, in Patent Literature 1, the out-of-head localization process performs DRC (Dynamic Range Compression) processing on the reproduced signal, and the processing device smooths the frequency characteristics in the stage before the DRC processing. Further, the processing device divides a band based on the smoothed characteristics.

SUMMARY

The out-of-head localization processing uses a spatial acoustic filter obtained from the spatial acoustic transfer characteristics for the number of speakers and an inverse filter calculated from an ECTF (ear canal transfer function) of the headphones. To maximize the out-of-head localization effect, it is ideal to use a spatial acoustic filter as measured as possible and an accurate inverse filter.

However, steep peaks (narrow band parts with very high levels) and dips (narrow band parts with very low levels) occur in the frequency-amplitude characteristics obtained by measurement using a microphone. For this reason, signals subjected to signal processing are often clipped.

Levels and frequencies of the peaks and dips change due to various factors. For example, the levels and frequencies change depending on the characteristics of the speaker at the measurement position, the acoustic characteristics of the room, the characteristics of the headphones, and the like. In addition, the levels and frequencies change depending on the shape of the individual head and ears. For this reason, it has been necessary to confirm the characteristics each time depending on the equipment used at the time of measurement, and to make adjustments according to the equipment while listening and confirming.

Consequently, too large correction amount (compression amount) in the compression processing breaks the balance of the individual characteristics possessed by an individual. This may break the balance of localization, and impair the effect of out-of-head localization.

Further, accurately measuring the individual characteristics of the low-frequency band requires to lengthen the sound pickup time of the microphone. If the person being measured with a microphone worn on the ear moves during the measurement, the individual characteristics change. Thus, it is difficult to generate well-balanced filters.

The present disclosure has been made in view of the above points, and an object of the present disclosure is to provide a processing device and a processing method capable of generating well-balanced filters.

A processing device according to an embodiment includes: a frequency characteristics acquisition unit configured to acquire frequency characteristics of at least one sound pickup signal; a smoothing processing unit configured to: smooth spectral data that are based on the frequency characteristics; and thereby generate smoothed spectral data; a compression unit configured to: compress the smoothed spectral data, using a predetermined value; and thereby generate compressed spectral data; and a filter generation unit configured to generate a filter, based on the compressed spectral data.

A processing method according to this embodiment includes: a step of acquiring frequency characteristics of an input signal; a step of performing a smoothing processing so as to generate second spectral data smoother than first spectral data, the first spectral data being based on the frequency characteristics; a step of: calculating a first difference value corresponding to a difference between the second spectral data and the first spectral data in a first band; and compressing, based on the first difference value, the second spectral data; and a step of generating a filter, based on the second spectral data.

A processing method according to this embodiment includes: a step of acquiring frequency characteristics of at least one sound pickup signal; a step of: smoothing spectral data that are based on the frequency characteristics; and thereby generating smoothed spectral data; a step of calculating an adjustment level, based on the smoothed spectral data in a first band; a step of: compressing the smoothed spectral data in a second band, using the adjustment level; and thereby generating compressed spectral data; and a step of generating a filter, based on the compressed spectral data.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

The overview of a sound localization processing according to an embodiment is described hereinafter. The out-of-head localization processing according to this embodiment performs out-of-head localization processing by using spatial acoustic transfer characteristics and ear canal transfer characteristics. The spatial acoustic transfer characteristics are transfer characteristics from a sound source such as speakers to the ear canal. The ear canal transfer characteristics are transfer characteristics from the speaker unit of headphones or earphones to the eardrum. In this embodiment, the spatial acoustic transfer characteristics are measured without headphones or earphones being worn, and the ear canal transfer characteristics are measured with headphones or earphones being worn, so that out-of-head localization processing is implemented using these measurement data. This embodiment is characterized by a microphone system for measuring spatial acoustic transfer characteristics or ear canal transfer characteristics.

The out-of-head localization processing according to this embodiment is executed on a user terminal such as a personal computer, a smart phone, or a tablet PC. The user terminal is an information processing device including processing means such as a processor, storage means such as a memory or a hard disk, display means such as a liquid crystal monitor, and input means such as a touch panel, a button, a keyboard and a mouse. The user terminal may have a communication function to transmit and receive data. Further, the user terminal is connected to output means (output unit) with headphones or earphones. The connection between the user terminal and the output means may be a wired connection or a wireless connection.

First Embodiment (Out-of-Head Localization Processing Device)

Figure 1:
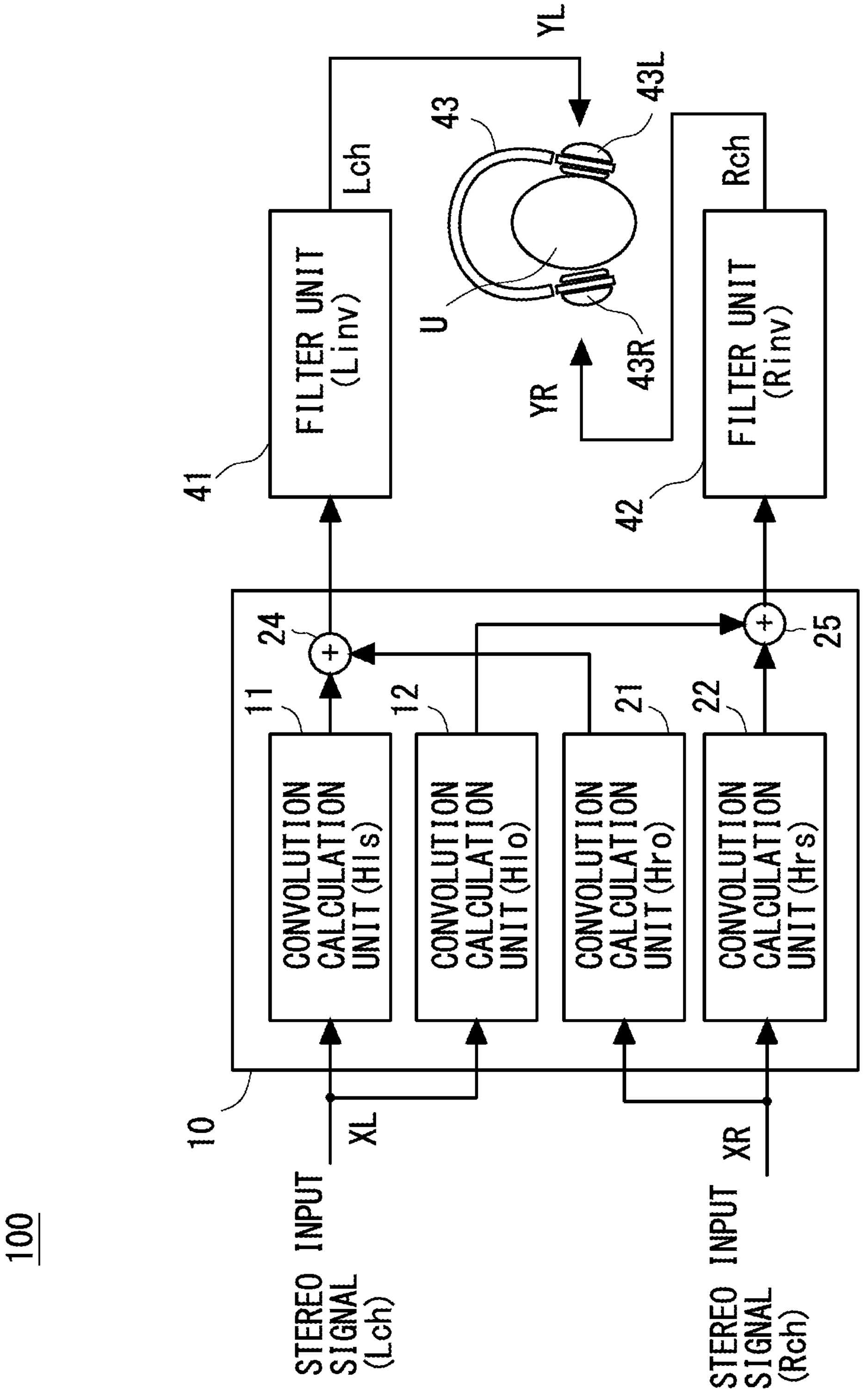
FIG. 1 is a block diagram showing an out-of-head localization processing device according to an embodiment.

FIG. 1 shows a block diagram of the out-of-head localization processing device 100, which is an example of a sound field reproducing device according to this embodiment. The out-of-head localization processing device 100 reproduces a sound field for the user U who wears the headphones 43. Thus, the out-of-head localization processing device 100 performs sound localization processing for L-ch and R-ch stereo input signals XL and XR. The L-ch and R-ch stereo input signals XL and XR are analog audio reproduced signals that are output from a CD (Compact Disc) player or the like or digital audio data such as mp3 (MPEG Audio Layer-3). Note that the audio reproduced signals or digital audio data are collectively referred to as a reproduced signal. In other words, the stereo input signals XL and XR of L-ch and R-ch are reproduced signals.

Note that the out-of-head localization processing device 100 is not limited to a physically single device, and a part of processing may be performed in a different device. For example, a part of the processing may be performed by a smart phone or the like, and the remaining processing may be performed by a DSP (Digital Signal Processor) built in the headphones 43 or the like.

The out-of-head localization processing device 100 includes an out-of-head localization unit 10, a filter unit 41 for storing an inverse filter Linv, a filter unit 42 for storing an inverse filter Rinv, and headphones 43. The out-of-head localization unit 10, the filter unit 41, and the filter unit 42 can be specifically implemented by a processor or the like.

The out-of-head localization unit 10 includes convolution calculation units 11 to 12 and 21 to 22 for storing the spatial acoustic transfer characteristics Hls, Hlo, Hro, and Hrs, and adders 24, 25. The convolution calculation units 11 to 12 and 21 to 22 perform convolution processing using the spatial acoustic transfer characteristics. The stereo input signals XL and XR from a CD player or the like are input to the out-of-head localization unit 10. The spatial acoustic transfer characteristics are set to the out-of-head localization unit 10. The out-of-head localization unit 10 convolves a filter of the spatial acoustic transfer characteristics (which is hereinafter referred to also as spatial acoustic filters) into each of the stereo input signals XL and XR. The spatial acoustic transfer characteristics may be a head-related transfer function HRTF measured in the head or auricle of a person being measured, or may be the head-related transfer function of a dummy head or a third person.

The spatial acoustic transfer function is a set of four spatial acoustic transfer characteristics Hls, Hlo, Hro and Hrs. Data used for convolution in the convolution calculation units 11 to 12 and 21 to 22 serve as the spatial acoustic filters. A spatial acoustic filter is generated by cutting out the spatial acoustic transfer characteristics Hls, Hlo, Hro and Hrs with a specified filter length.

Each of the spatial acoustic transfer characteristics Hls, Hlo, Hro and Hrs is acquired in advance by impulse response measurement or the like. For example, the user U wears microphones on the left and right ears, respectively. Left and right speakers placed in front of the user U output impulse sounds for performing impulse response measurements. Then, the measurement signals such as the impulse sounds output from the speakers are picked up by the microphones. The spatial acoustic transfer characteristics Hls, Hlo, Hro and Hrs are acquired based on sound pickup signals in the microphones. The spatial acoustic transfer characteristics Hls between the left speaker and the left microphone, the spatial acoustic transfer characteristics Hlo between the left speaker and the right microphone, the spatial acoustic transfer characteristics Hro between the right speaker and the left microphone, and the spatial acoustic transfer characteristics Hrs between the right speaker and the right microphone are measured.

The convolution calculation unit 11 convolves the spatial acoustic filter in accordance with the spatial acoustic transfer characteristics Hls to the L-ch stereo input signal XL. The convolution calculation unit 11 outputs convolution calculation data to the adder 24. The convolution calculation unit 21 convolves the spatial acoustic filter in accordance with the spatial acoustic transfer characteristics Hro to the R-ch stereo input signal XR. The convolution calculation unit 21 outputs convolution calculation data to the adder 24. The adder 24 adds the two convolution calculation data and outputs the data to the filter unit 41.

The convolution calculation unit 12 convolves the spatial acoustic filter in accordance with the spatial acoustic transfer characteristics Hlo to the L-ch stereo input signal XL. The convolution calculation unit 12 outputs the convolution calculation data to the adder 25. The convolution calculation unit 22 convolves the spatial acoustic filter in accordance with the spatial acoustic transfer characteristics Hrs to the R-ch stereo input signal XR. The convolution calculation unit 22 outputs convolution calculation data to the adder 25. The adder 25 adds the two convolution calculation data and outputs the data to the filter unit 42.

Inverse filters Linv and Rinv for canceling the headphone characteristics (characteristics between the headphone reproduction units and the microphones) are set in the filter units 41 and 42. Then, the inverse filters Linv and Rinv are convolved into the reproduced signals (convolution calculation signals) subjected to processing in the out-of-head localization unit 10. The filter unit 41 convolves the inverse filter Linv of the L-ch headphone characteristics to the L-ch signal from the adder 24. Likewise, the filter unit 42 convolves the inverse filter Rinv of the R-ch headphone characteristics to the R-ch signal from the adder 25. The inverse filters Linv and Rinv cancel out the characteristics from the headphone units to the microphones when the headphones 43 are worn. The microphones may be placed at any position between the entrance of the ear canal and the eardrum.

The filter unit 41 outputs the processed L-ch signal YL to the left unit 43L of the headphones 43. The filter unit 42 outputs the processed R-ch signal YR to the right unit 43R of the headphones 43. The user U wears the headphones 43. The headphones 43 output the L-ch signal YL and the R-ch signal YR (hereinafter, the L-ch signal YL and the R-ch signal YR are collectively referred to as a stereo signal) toward the user U. This can reproduce sound images localized outside the head of the user U.

As described above, the out-of-head localization processing device 100 performs out-of-head localization using the spatial acoustic filters in accordance with the spatial acoustic transfer characteristics Hls, Hlo, Hro, and Hrs, and the inverse filters Linv and Rinv of the headphone characteristics. In the following description, the spatial acoustic filters corresponding to the spatial acoustic transfer characteristics Hls, Hlo, Hro, and Hrs, and the inverse filters Linv and Rinv of the headphone characteristics are collectively referred to as an out-of-head localization processing filter. In the case of 2 ch stereo reproduced signals, the out-of-head localization filter is composed of four spatial acoustic filters and two inverse filters. The out-of-head localization processing device 100 then carries out convolution calculation processing on the stereo reproduced signals by using the out-of-head localization filter composed of totally six filters, and thereby performs out-of-head localization. The out-of-head localization filter is preferably based on the measurement of the individual user U. For example, the out-of-head localization filter is set based on sound pickup signals picked up by the microphones worn on the ears of the user U.

In this way, the spatial acoustic filters and the inverse filters Linv and Rinv for headphone characteristics are filters for audio signals. These filters are convolved into the reproduced signals (stereo input signals XL and XR), and thereby the out-of-head localization processing device 100 executes the out-of-head localization processing. In this embodiment, one of the technical features is processing of generating the spatial acoustic filters. Specifically, the processing of generating spatial acoustic filters includes level range control processing (Level Range Control, hereinafter referred to as LRC processing) for compressing ranges of the gain levels of spectral data in frequency characteristics. Here, the level width between the minimum gain level and the maximum gain level of the spectral data of the frequency characteristics is referred to as a level range.

(Measurement Device of Spatial Acoustic Transfer Characteristics)

Figure 2:
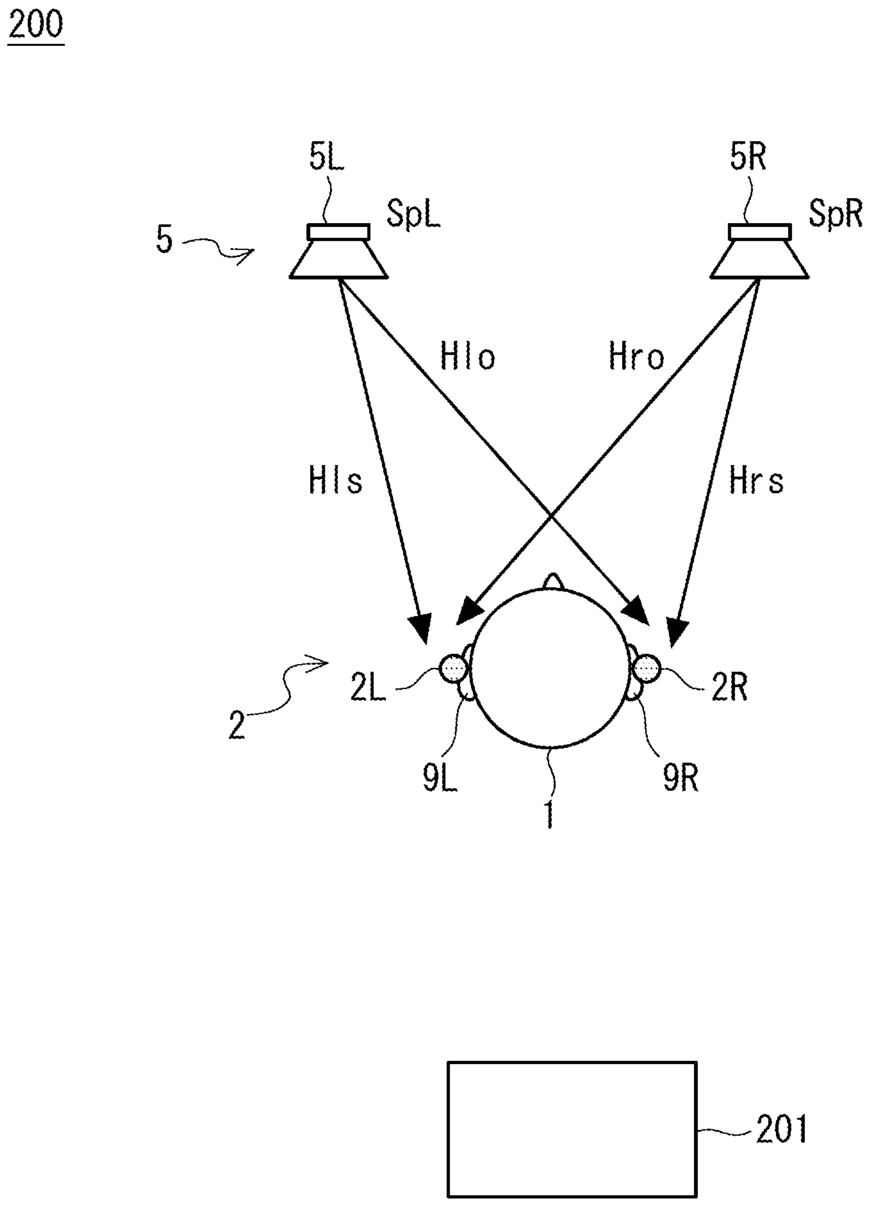
FIG. 2 is a diagram schematically showing a configuration of a measurement device.

A measurement device 200 for measuring the spatial acoustic transfer characteristics Hls, Hlo, Hro, and Hrs is described hereinafter with reference to FIG. 2. FIG. 2 is a diagram schematically showing a measurement configuration for performing measurement on a person 1 being measured. Note that the person 1 being measured here is the same person as the user U in FIG. 1, but may be a different person.

As shown in FIG. 2, the measurement device 200 includes a stereo speaker 5 and a microphone unit 2. The stereo speaker 5 is placed in a measurement environment. The measurement environment may be the user U's room at home, a dealer or showroom of an audio system, or the like. The measurement environment is preferably a listening room where speakers and acoustics are in good condition.

In this embodiment, a processing device 201 of the measurement device 200 performs arithmetic processing for appropriately generating the spatial acoustic filters. The processing device 201 includes a music player such as a CD player, for example. The processing device 201 may be a personal computer (PC), a tablet terminal, a smart phone or the like. Further, the processing device 201 may be a server device.

The stereo speaker 5 includes a left speaker 5L and a right speaker 5R. For example, the left speaker 5L and the right speaker 5R are placed in front of the person 1 being measured. The left speaker 5L and the right speaker 5R output impulse sounds or the like for impulse response measurement. Although the number of speakers, which serve as sound sources, is 2 (stereo speakers) in this embodiment, the number of sound sources to be used for measurement is not limited to 2, and it may be 1 or more. In other words, this embodiment can be applied to 1 ch monaural, or what is called a multi-channel environment such as 5.1 ch or 7.1 ch in the same manner.

The microphone unit 2 is stereo microphones including a left microphone 2L and a right microphone 2R. The left microphone 2L is placed on a left ear 9L of the person 1 being measured, and the right microphone 2R is placed on a right ear 9R of the person 1 being measured. To be specific, the microphones 2L and 2R are preferably placed at a position between the entrance of the ear canal and the eardrum of the left ear 9L and the right ear 9R, respectively. The microphones 2L and 2R pick up measurement signals output from the stereo speaker 5 and acquire sound pickup signals. The microphones 2L and 2R output the sound pickup signals to the processing device 201. The person 1 being measured may be a person or a dummy head. In other words, in this embodiment, the person 1 being measured is a concept that includes not only a person but also a dummy head.

As described above, impulse sounds output from the left speaker 5L and right speaker 5R are measured using the microphones 2L and 2R, respectively, and thereby impulse response is measured. The processing device 201 stores the sound pickup signals acquired by the impulse response measurement into a memory or the like. The spatial acoustic transfer characteristics Hls between the left speaker 5L and the left microphone 2L, the spatial acoustic transfer characteristics Hlo between the left speaker 5L and the right microphone 2R, the spatial acoustic transfer characteristics Hro between the right speaker 5R and the left microphone 2L, and the spatial acoustic transfer characteristics Hrs between the right speaker 5R and the right microphone 2R are thereby measured. Specifically, the left microphone 2L picks up the measurement signal that is output from the left speaker 5L, and thereby the spatial acoustic transfer characteristics Hls are acquired. The right microphone 2R picks up the measurement signal that is output from the left speaker 5L, and thereby the spatial acoustic transfer characteristics Hlo are acquired. The left microphone 2L picks up the measurement signal that is output from the right speaker 5R, and thereby the spatial acoustic transfer characteristics Hro are acquired. The right microphone 2R picks up the measurement signal that is output from the right speaker 5R, and thereby the spatial acoustic transfer characteristics Hrs are acquired.

Further, the measurement device 200 may generate the spatial acoustic filters in accordance with the spatial acoustic transfer characteristics Hls, Hlo, Hro and Hrs from the left and right speakers 5L and 5R to the left and right microphones 2L and 2R based on the sound pickup signals. For example, the processing device 201 cuts out the spatial acoustic transfer characteristics Hls, Hlo, Hro, and Hrs with a specified filter length. The processing device 201 may correct the measured spatial acoustic transfer characteristics Hls, Hlo, Hro, and Hrs.

In this manner, the processing device 201 generates the spatial acoustic filters to be used for convolution calculation of the out-of-head localization processing device 100. As shown in FIG. 1, the out-of-head localization processing device 100 performs out-of-head localization by using the spatial acoustic filters in accordance with the spatial acoustic transfer characteristics Hls, Hlo, Hro, and Hrs between the left and right speakers 5L and 5R and the left and right microphones 2L and 2R. Specifically, the out-of-head localization is performed by convolving the spatial acoustic filters to the audio reproduced signals.

The processing device 201 performs the same processing on the sound pickup signal corresponding to each of the spatial acoustic transfer characteristics Hls, Hlo, Hro, and Hrs. Specifically, the same processing is performed on each of the four sound pickup signals corresponding to the spatial acoustic transfer characteristics Hls, Hlo, Hro, and Hrs. The spatial acoustic filters respectively corresponding to the spatial acoustic transfer characteristics Hls, Hlo, Hro and Hrs are thereby generated.

Figure 3:
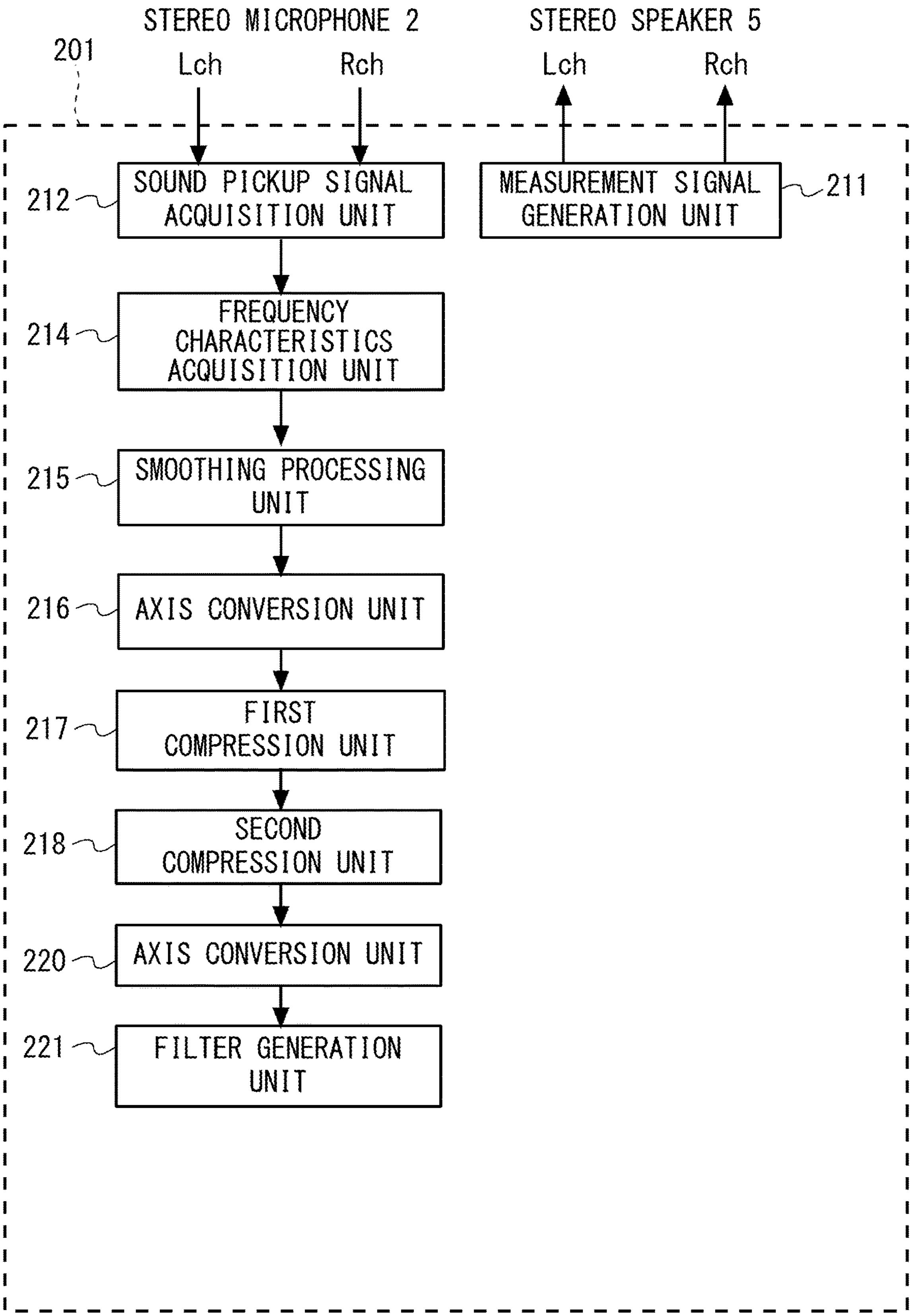
FIG. 3 is a block diagram showing a configuration of a processing device.

Hereinafter, the processing device 201 of the measurement device 200 and its processing will be described in detail. FIG. 3 is a control block diagram showing the processing device 201. The processing device 201 includes: a measurement signal generation unit 211; a sound pickup signal acquisition unit 212; a frequency characteristics acquisition unit 214; a smoothing processing unit 215; an axis conversion unit 216; a first compression unit 217 and a second compression unit 218; an axis conversion unit 220; and a filter generation unit 221.

The measurement signal generation unit 211 includes a D/A converter, and an amplifier, and generates a measurement signal for measuring the ear canal transfer characteristics. The measurement signal is, for example, an impulse signal, or a TSP (Time Stretched Pulse) signal. Here, the measurement device 200 performs impulse response measurement, using the impulse sound as the measurement signal.

The left microphone 2L and the right microphone 2R of the microphone unit 2 each pick up the measurement signal and output the sound pickup signal to the processing device 201. The sound pickup signals picked up by the left microphone 2L and the right microphone 2R are input to the processing device 201 as input signals. The sound pickup signal acquisition unit 212 acquires the sound pickup signals picked up by the left microphone 2L and the right microphone 2R. Note that the sound pickup signal acquisition unit 212 may include an A/D converter that A/D-converts the sound pickup signals from the microphones 2L and 2R. The sound pickup signal acquisition unit 212 may synchronously add the signals obtained by a plurality of measurements.

The frequency characteristics acquisition unit 214 acquires frequency characteristic of the sound pickup signal. The frequency characteristics acquisition unit 214 calculates the frequency characteristics of the sound pickup signal by discrete Fourier transform or the discrete cosine transform. The frequency characteristics acquisition unit 214 calculates the frequency characteristics, for example, by performing FFT (fast Fourier transform) on the sound pickup signal in the time domain. The frequency characteristics include an amplitude spectrum and a phase spectrum. Note that the frequency characteristics acquisition unit 214 may generate a power spectrum instead of the amplitude spectrum.

The smoothing processing unit 215 performs smoothing processing to generate second spectral data smoother than the first spectral data based on the frequency characteristics. In other words, the smoothing processing unit 215 performs smoothing processing on the spectral data based on the frequency characteristics. The smoothing processing unit 215 smooths the spectral data by using a method such as a moving average, a Savitzky-Golay filter, a smoothing spline, a cepstrum transform, and a cepstrum envelope.

The smoothing processing unit 215 gives an order of the lifter as the order of smoothing when smoothing by cepstrum analysis. In this case, the smoothing processing unit 215 can change the degree of smoothing by giving different values to the order of smoothing. When the order is high, the degree of smoothing is low, and when the order is low, the degree of smoothing is high. Therefore, the spectral data obtained by the smoothing processing of a low-order is smoothed more than the spectral data obtained by the smoothing processing of a high-order. The spectral data obtained by the smoothing processing of low-order is smoother than the spectral data obtained by the smoothing process of high-order.

In this embodiment, the smoothing processing unit 215 performs smoothing processing of different orders on the frequency-amplitude characteristics, and thereby generates first spectral data and second spectral data. The smoothing processing unit 215 performs smoothing processing of a relatively high-order on the frequency-amplitude characteristics (amplitude spectrum), and thereby calculates the first spectral data. The smoothing processing unit 215 performs smoothing processing of a relatively low-order on the spectral data of the frequency-amplitude characteristics, and thereby calculates the second spectral data (also referred to as smoothed spectral data). The smoothing processing unit 215 generates the first spectral data and the second spectral data smoother than the first spectral data.

Note that, in the following embodiment, the spectral data subjected to smoothing processing with a high-order is used for the first spectral data. Note that the spectral data, which has not been subjected to smoothing processing on its frequency-amplitude characteristics, may be used for the first spectral data. In other words, the frequency-amplitude characteristics obtained by FFT can be used for the first spectral data.

Alternatively, the smoothing processing unit 215 performs the smoothing processing a plurality of times, and thereby generates the first spectral data and the second spectral data. Specifically, the smoothing processing unit 215 performs the first smoothing processing on the frequency-amplitude characteristics, and thereby generates the first spectral data. The smoothing processing unit 215 performs the second smoothing processing on the first spectral data subjected to the smoothing processing, and thereby generates the second spectral data. In this case, the smoothing processing unit 215 may use the same smoothing process or different smoothing processes in the first smoothing processing and the second smoothing processing.

Figure 4:
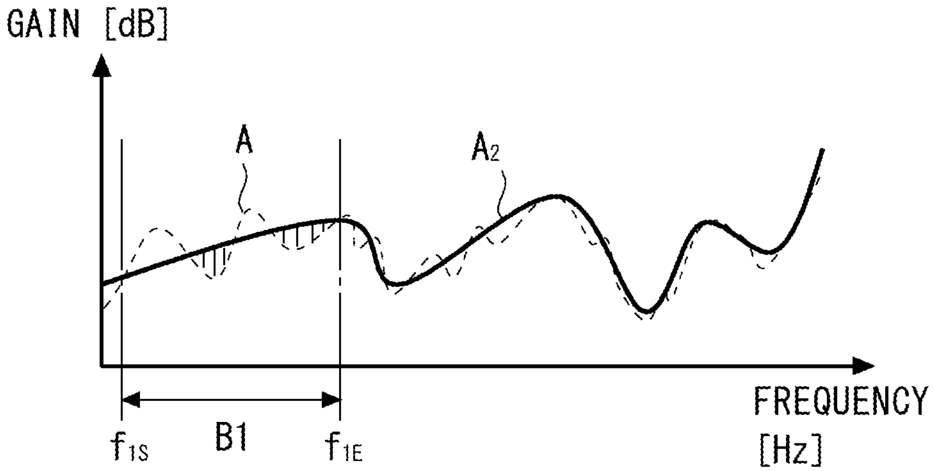
FIG. 4 is a graph for explaining first compression processing.

FIG. 4 is a graph showing the first spectral data A and the second spectral data $A_2$. In FIG. 4, the horizontal axis is the frequency [Hz] and the vertical axis is the amplitude value (gain) [dB]. The second spectral data $A_2$ is smoother than the first spectral data A. In other words, the second spectral data $A_2$ has gain data smoother than that of the first spectral data A.

The axis conversion unit 216 converts the frequency axes of the first spectral data A and the second spectral data $A_2$ by data interpolation. The axis conversion unit 216 changes the scale of the frequency-amplitude characteristics data so that the discrete spectral data are equally spaced on the logarithmic axis. In the frequency characteristics acquisition unit 214, the first and second spectral data (hereinafter, collectively referred to as gain data) are equally spaced in terms of frequency. In other words, the gain data are equally spaced on the linear frequency axis, and they therefore are not equally spaced on the logarithmic frequency axis. So, the axis conversion unit 216 performs interpolation processing on the gain data so that the gain data are equally spaced on the frequency logarithmic axis.

On the logarithmic axis, the lower the frequency range is, the more sparsely adjacent data in the gain data are spaced, and the higher the frequency range is, the more densely the adjacent data therein are spaced. So, the axis conversion unit 216 interpolates the data in the low-frequency band in which the data are sparsely spaced. Specifically, the axis conversion unit 216 performs interpolation processing such as three-dimensional spline interpolation, and thereby obtains discrete gain data equally spaced on the logarithmic axis. The gain data on which the axis conversion has been performed is referred to as the axis conversion data. The axis conversion data is a spectrum in which the frequencies and the amplitude values (gain values) correspond to each other. The axis conversion data is smoothed spectral data on which axis conversion has been performed.

The following describes the reason for converting the frequency axis to a log scale. In general, it is said that the amount of sensitivity of a human is converted to logarithmic values. Therefore, it is important to consider the frequency of the audible sound on the logarithmic axis. The scale conversion causes the data to be equally spaced in the amount of sensitivity, and enables the data to be treated equivalently in all frequency bands. This facilitates mathematical calculation, frequency band division and weighting, enabling them to obtain stable results. Note that the axis conversion unit 216 is only required to convert envelope data to, without being limited to the log scale, a scale approximate to the auditory sense of a human (referred to as an auditory scale). The axis conversion is performed using an auditory scale such as a log scale, a mel scale, a Bark scale, an ERB (Equivalent Rectangular Bandwidth) scale.

The axis conversion unit 216 performs scale conversion on the gain data with an auditory scale by data interpolation. For example, the axis conversion unit 216 interpolates the data in the low-frequency band, in which the data are sparsely spaced on the auditory scale, to densify the data in the low-frequency band. The data equally spaced on the auditory scale are densely spaced in the low-frequency band and sparsely spaced in the high-frequency band on the linear scale. This enables the axis conversion unit 216 to generate axis conversion data equally spaced on the auditory scale. Of course, the axis conversion data does not need to be completely equally spaced data on the auditory scale.

The first compression unit 217 performs the first compression processing on the second spectral data in the first band B1. The first compression unit 217 calculates a first difference value according to the difference between the second spectral data and the first spectral data in the first band B1. The first compression unit 217 compresses the second spectral data based on the first difference value. For example, the first compression unit 217 determines a value ($A_2$−A) obtained by subtracting the first spectral data A from the second spectral data $A_2$ to be the first difference value. The first difference value is calculated for each frequency.

When the first difference value ($A_2$−A) is a positive value, the first compression unit 217 calculates the first compression value by multiplying the first difference value ($A_2$−A) by the first compression coefficient lrcRate1. The first compression value [lrcRate1*($A_2$−A)] is added to the second spectral data $A_2$, and thereby the compression processing is performed. The first compression unit 217 does not perform compression when the first difference value is a negative value. In other words, the gain of the second spectral data is used as it is.

The first compression processing in the first compression unit 217 is represented by the following expressions (1) and (2).

When A is less than $A_2$, $$A_{lrc1} = \mathrm{lrcRate1} * (A_2 - A) + A_2 \quad (1)$$

When A is $A_2$ or more, $$A_{lrc2} - A_2 \quad (2)$$

The first compression unit 217 calculates the $A_{lrc1}$ at each frequency. The first compression unit 217 does not add the first compression value to the second spectral data at a frequency in which the gain of the first spectral data is higher than the gain of the second spectral data. The first compression unit 217 adds the first compression value to the second spectral data at a frequency in which the gain of the first spectral data is lower than the gain of the second spectral data. At a frequency in which the gain of the first spectral data is lower than the gain of the second spectral data, the range is compressed so that the gain of the second spectral data approaches the gain of the first spectral data. The first compression unit 217 performs the first compression processing on the second spectral data in the first band B1, and thereby generates third spectral data. In other words, the second spectral data compressed by the first compression unit 217 becomes the third spectral data.

For example, when the second spectral data $A_2$ at a frequency is 5 dB, and the first spectral data A is 3 dB, the first difference value ($A_2$−A) is 2 dB. Then, when the first compression coefficient lrcRate1=0.5, the first compression value is 0.5*(5−3)=1 [dB], and the third spectral data $A_{lrc1}$=5−1=4 [dB].

In this way, the first compression unit 217 determines whether to perform compression based on the first difference value. In other words, the first compression unit 217 determines the frequency at which compression is performed and the frequency at which compression is not performed according to the sign (positive or negative) of the first difference value. At the frequency at which compression is performed, the gain after compression is a value between the first spectral data and the second spectral data.

Figure 5:
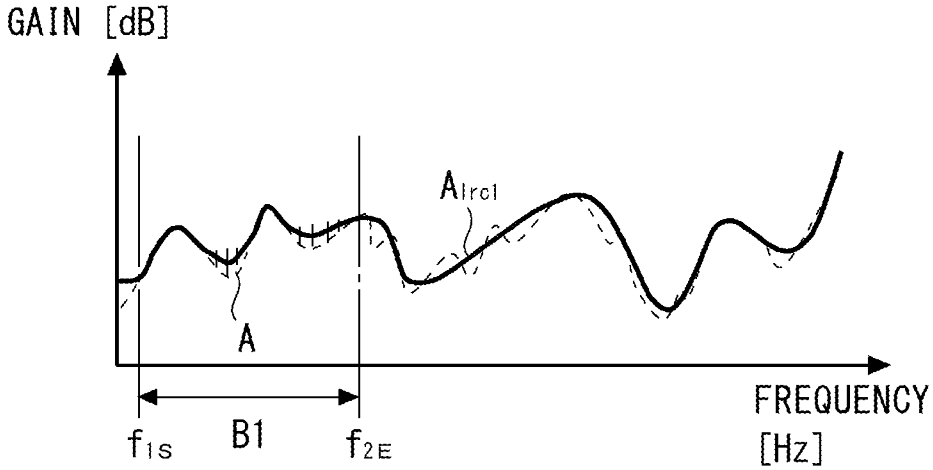
FIG. 5 is a graph showing a spectrum obtained by the first compression processing.

FIG. 5 shows the third spectral data $A_{lrc1}$ obtained in the first compression processing in the first compression unit 217. FIG. 5 is a graph showing the third spectral data $A_{lrc1}$. In a band other than the first band B1, the gain of the second spectral data and the gain of the third spectral data are the same. The lower limit frequency of the first band B1 is $f_{1S}$, and the upper limit frequency is $f_{1E}$.

For example, the first band B1 can be 20 Hz to 1 kHz. The lower limit frequency $f_{1S}$ of the first band B1 is 20 Hz, and the upper limit frequency $f_{1E}$ is 1 kHz. Of course, the first band B1 is not limited to this range.

The second compression unit 218 performs second compression processing on the third spectral data in the second band. The second compression unit 218 calculates the second difference value according to the difference between the reference value and the third spectral data in the second band. The second compression unit 218 compresses the third spectral data based on the second difference value. The reference value $A_{ref}$ is a predetermined value in the gain of the spectral data, and is a constant value of 0 [dB] here. Note that the reference value is at a constant level in the second band, but it may differ depending on the frequency.

The second compression unit 218 determines a value ($A_{ref}$-$A_{lrc1}$), which is obtained by subtracting the third spectral data $A_{lrc1}$ from the reference value $A_{ref}$, to be the second difference value. The second difference value is determined for each frequency. When the second difference value is a negative value, the second compression unit 218 multiplies the second difference value by the second compression coefficient lrcRate2, to calculate the second compression value. The second compression unit 218 adds the second compression value [lrcRate2*($A_{ref}$-$A_{lrc1}$)] to the third spectral data $A_{lrc1}$ and thereby performs the compression process. The second compression unit 218 does not perform compression when the second difference value is a positive value. In other words, the gain of the third spectral data $A_{lrc1}$ is used as it is.

The second compression processing in the second compression unit 218 is represented by the following expressions (3) and (4).

When $A_{lrc1}$ is less than $A_{ref}$, $$A_{lrc2}=\text{lrcRate2}*(A_{ref}-A_{lrc1})+A_{lrc1} \tag{3}$$

When $A_{lrc1}$ is $A_{ref}$ or higher, $$A_{lrc2}=A_{lrc1} \tag{4}$$

Figure 6:
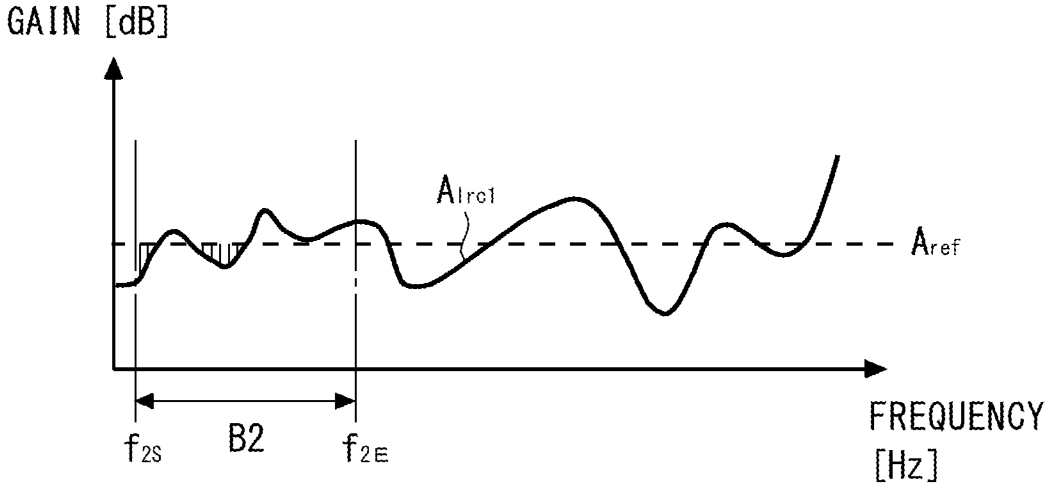
FIG. 6 is a graph for explaining second compression processing.
Figure 7:
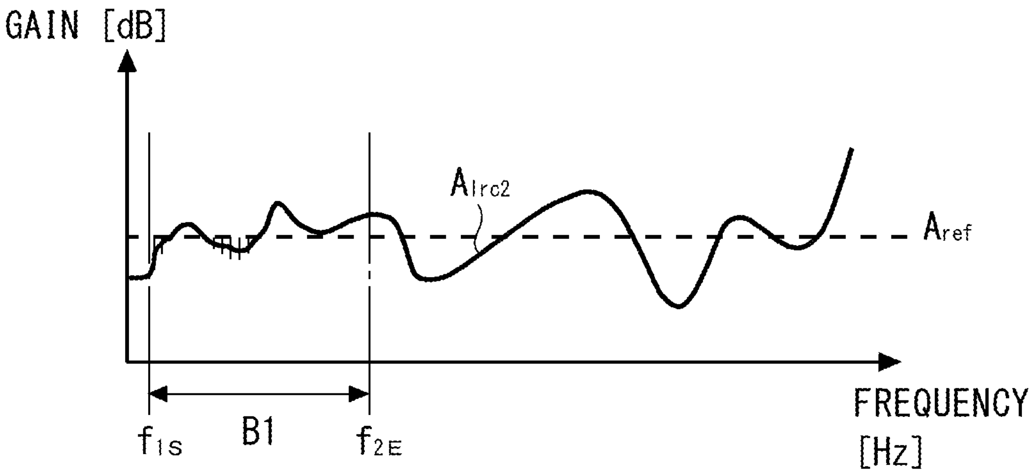
FIG. 7 is a graph showing a spectrum obtained by the second compression processing.

FIG. 6 is a graph showing the second difference value between the third spectral data and the reference value. The second compression unit 218 calculates the $A_{lrc2}$ at each frequency. The second compression unit 218 does not add the second compression value to the third spectral data at a frequency in which the gain of the third spectral data is higher than the reference value. The second compression unit 218 adds the second compression value to the third spectral data at a frequency in which the gain of the third spectral data is lower than the reference value. At a frequency in which the gain of the third spectral data is lower than the reference value, the second compression unit 218 compresses the range so that the gain of the third spectral data approaches the reference value. The second compression unit 218 performs the second compression processing on the third spectral data in the second band B2, and thereby generates the fourth spectral data. In other words, the third spectral data compressed in the second compression unit 218 becomes the fourth spectral data. FIG. 7 shows the fourth spectral data Aura obtained by the second compression processing in the second compression unit 218.

For example, when the third spectral data $A_{lrc1}$ is −2 dB, and the reference value $A_{ref}$ is 0 dB, the difference value ($A_{ref}$-$A_{lrc1}$) is 2 dB. Then, when the second compression coefficient lrcRate2=0.5, the second compression value is 0.5*2=1 [dB], and the fourth spectral data $A_{lrc2}$32 1−2=−1 [dB].

In this way, the second compression unit 218 determines whether to perform compression based on the second difference value. In other words, the second compression unit 218 determines the frequency at which compression is performed and the frequency at which compression is not performed according to the sign (positive or negative) of the second difference value. At the frequency at which compression is performed, the gain after compression is a value between the third spectral data and the reference value.

In a band other than the second band B2, the gain of the third spectral data and the gain of the fourth spectral data are the same. Here, the lower limit frequency of the second band B2 is $f_{2S}$, and the upper limit frequency is $f_{2E}$.

The lower limit frequency $f_{2S}$ of the second band B2 has the same value as the lower limit frequency $f_{1S}$ of the first band B1. For example, the lower limit frequency $f_{2S}$ and the lower limit frequency $f_{1S}$ are 20 Hz. The upper limit frequency $f_{2E}$ of the second band B2 has the same value as the upper limit frequency $f_{1E}$ of the first band B1. For example, the upper limit frequency $f_{2E}$ and the upper limit frequency $f_{1E}$ are 1 kHz.

The first band B1 and the second band B2 are low-frequency bands of 20 Hz or more and 1 kHz or less. Of course, the lower limit frequency $f_{2S}$ and the lower limit frequency $f_{1S}$ are not limited to 20 Hz. The upper limit frequency $f_{2E}$ and the upper limit frequency $f_{1E}$ are not limited to 1 kHz.

The axis conversion unit 220 performs axis conversion to convert the frequency axis of the fourth spectral data by data interpolation or the like. The processing in the axis conversion unit 220 is the opposite of the processing in the axis conversion unit 216. The axis conversion unit 220 performs the axis conversion, and thereby returns the frequency axis of the fourth spectral data to the frequency axis before the axis conversion in the axis conversion unit 216. For example, the axis conversion unit 220 performs processing for returning the frequency axis converted to the log scale in the axis conversion unit 216, to the linear scale. The axis conversion unit 220 makes the fourth spectral data into data equally spaced on the linear frequency axis. This allows obtaining the frequency-amplitude characteristics of the same frequency axis as the frequency-phase characteristics acquired by the frequency characteristics acquisition unit 214. In other words, the frequency axes (data intervals) of the spectral data of the frequency-phase characteristics and the frequency-amplitude characteristics become the same.

The filter generation unit 221 generates a filter using the fourth spectral data subjected to axis conversion by the axis conversion unit 220. The filter generation unit 221 generates a filter applied to the reproduced signal based on the fourth spectral data. For example, the filter generation unit 221 calculates a signal in the time domain from the amplitude characteristics and the phase characteristics by inverse discrete Fourier transform or inverse discrete cosine transform. The filter generation unit 221 generates a temporal signal by performing IFFT (inverse fast Fourier transform) on the amplitude characteristics and the phase characteristics. The filter generation unit 221 calculates a spatial acoustic filter by cutting out the generated temporal signal with a specified filter length. The filter generation unit 221 may perform windowing to generate a spatial acoustic filter.

The filter generation unit 221 performs the above processing on the sound pickup signal obtained by picking up the measurement signal from the left speaker 5L with the left microphone 2L, and thereby generates a spatial acoustic filter corresponding to the spatial acoustic transfer characteristics Hls. The filter generation unit 221 performs the above processing on the sound pickup signal obtained by picking up the measurement signal from the left speaker 5L with the right microphone 2R, and thereby generates a spatial acoustic filter corresponding to the spatial acoustic transfer characteristics Hlo.

The filter generation unit 221 performs the above processing on the sound pickup signal obtained by picking up the measurement signal from the right speaker 5R with the left microphone 2L, and thereby generates a spatial acoustic filter corresponding to the spatial acoustic transfer characteristics Hro. The filter generation unit 221 performs the above processing on the sound pickup signal obtained by picking up the measurement signal from the right speaker 5R with the right microphone 2R, and thereby generates a spatial acoustic filter corresponding to the spatial acoustic transfer characteristics Hrs.

This can compress the frequency characteristics in a well-balanced manner. This can generate a filter suitable for localization of sound images. This can prevent an imbalance of sound image localization. This can localize well-balanced sound images. This can generate a filter tuned to a balanced sound quality; and this can make sound quality natural in terms of hearing feeling.

In particular, this can compress the low frequency band lower than the upper limit frequency in a well-balanced manner, achieving excellent sound quality in the low-frequency band. If the sound pickup time of the measurement device 200 of FIG. 2 is short, this can also generate well-balanced filters.

The lower limit frequency $f_{2S}$ of the second band B2 may have a value different from the lower limit frequency $f_{1S}$ of the first band B1. For example, the lower limit frequency $f_{2S}$ of the second band B2 may be larger than the lower limit frequency $f_{1S}$ of the first band B1 and smaller than the upper limit frequency $f_{2E}$ of the second band B2.

The upper limit frequency $f_{2E}$ of the second band B2 may have a value different from the upper limit frequency $f_{1E}$ of the first band B1. For example, the upper limit frequency $f_{2E}$ of the second band B2 may to be smaller than the upper limit frequency $f_{1E}$ of the first band B1 and larger than the lower limit frequency $f_{2S}$ of the second band B2.

The first compression coefficient lrcRate1 and the second compression coefficient lrcRate2 may have the same value or different values. Here, the first compression coefficient lrcRate1 and the second compression coefficient lrcRate2 are 0.5. Of course, the values of the first compression coefficient lrcRate1 and the second compression coefficient lrcRate2 are not limited to 0.5.

As shown in FIG. 2, the measurement signal from one speaker is picked up by the left and right microphones 2L and 2R. Therefore, one measurement acquires two sound pickup signals (also referred to as left and right sound pickup signals). The first compression coefficient lrcRate1 may have different values in the processing for the sound pickup signals of the left and right microphones 2L and 2R. Likewise, the second compression coefficient lrcRate2 may have different values for the left and right microphones 2L, and 2R.

Further, as shown in FIG. 2, the left and right speakers 5L and 5R and the left and right microphones 2L and 2R are used, thus acquiring four sound pickup signals. Specifically, the sound pickup signals indicating the spatial acoustic transfer characteristics Hls, Hlo, Hro, and Hrs are acquired. In this case, the first compression processing and the second compression processing can be performed on all four sound pickup signals. Alternatively, at least one of the four sound pickup signals do not need to undergo the first compression process or the second compression process. In other words, only the sound pickup signals in specific directions need to undergo the first compression processing and the second compression processing, and the sound pickup signals in the remaining directions do not need to undergo at least one of the first compression processing and the second compression processing.

Further, the first difference value may be the average value of the left and right sound pickup signals. Here, for example, the first spectral data and the second spectral data generated from the sound pickup signal of the left microphone 2L are respectively $A_L$ and $A_{2L}$. Then, the first spectral data and the second spectral data generated from the sound pickup signal of the right microphone 2R are respectively $A_R$ and $A_{2R}$. In this case, the first difference value can be the average value of the difference value obtained from the sound pickup signal on the left and the difference value obtained from the sound pickup signal on the right. The first difference value D1 is represented by the following expression (5).

$$D1=\{(A_{2L}-A_L)+(A_{2R}-A_R)\}/2 \quad (5)$$

The first difference value D1 is common to the left and right sound pickup signals. The first compression unit 217 replaces $(A_{2L}-A_L)$ in the expression (1) with D1 in the expression (5) to calculate the third spectral data $A_{lrc1}$ on left and right. Then, the first compression unit 217 performs the first compression processing using the common first difference value D1 on the spectral data on left and right. This can compress the left and right frequency characteristics in a well-balanced manner.

Further, in the first compression processing and the second compression processing, the audible balance is adjusted along the loudness curve, so that the compression coefficient and the band to be processed can be determined.

The first compression processing and the second compression processing may be performed alternately. Specifically, after the second compression processing, the first compression processing may be further performed. Here, a plurality of times of first compression processing and a plurality of times of second compression processing are performed. Each compression processing may have the band and compression coefficient identical to others or different from others. For example, the compression coefficient and the band may be the same or different between the first compression processing for the first time and the first compression processing for the second time.

Figure 8:
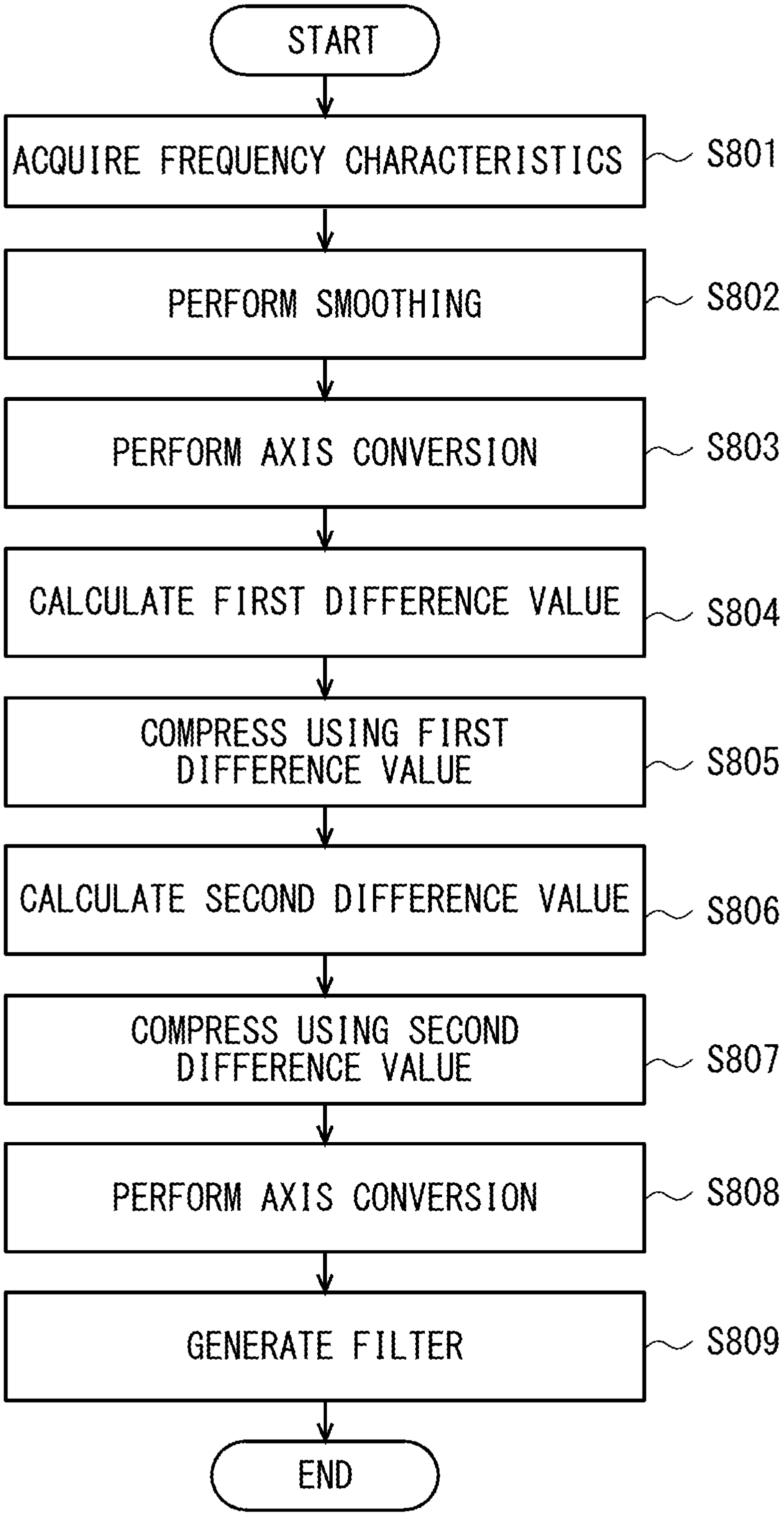
FIG. 8 is a flowchart illustrating a processing method according to an embodiment.

FIG. 8 is a flowchart showing a processing method according to this embodiment. First, the frequency characteristics acquisition unit 214 acquires the frequency characteristics of the sound pickup signal acquired by the sound pickup signal acquisition unit 212 (S801). For example, the frequency characteristics acquisition unit 214 converts the sound pickup signal in the time domain into signal in the frequency domain by FFT or the like. Next, the smoothing processing unit 215 performs smoothing processing on the spectral data (S802). As a result, the second spectral data is obtained. Further, the smoothing processing unit 215 changes the order of the smoothing processing, so that the first spectral data can be obtained.

The axis conversion unit 216 performs axis conversion on the second spectral data (S803). This allows obtaining spectral data obtained by converting the frequency axis of the sound pickup signal into a logarithmic axis. Note that the axis conversion processing by the axis conversion unit 216 can be omitted. In this case, the axis conversion processing by the axis conversion unit 220, which will be described later, is also unnecessary.

Next, the first compression unit 217 calculates the first difference value (S804). Specifically, the first compression unit 217 calculates the first difference value according to the difference between the second spectral data and the first spectral data. The first compression unit 217 compresses the second spectral data using the first difference value (S805). As a result, the third spectral data is calculated.

The second compression unit 218 calculates the second difference value (S806). Specifically, the second compression unit 218 calculates the second difference value according to the difference between the reference value and the third spectral data. The second compression unit 218 compresses the third spectral data using the second difference value (S807). As a result, the fourth spectral data is calculated.

The axis conversion unit 220 performs axis conversion of the fourth spectral data (S808). The filter generation unit 221 generates a filter based on the fourth spectral data after the axis conversion (S809). This generates the spatial acoustic filters corresponding to the spatial acoustic transfer characteristics Hls and Hlo or the spatial acoustic filters corresponding to the spatial acoustic transfer characteristics Hro and Hrs. This can generate well-balanced filters.

Note that the second compression processing may be omitted in the processing device and processing method according to this embodiment. In other words, the processing device 201 may perform only the first compression processing.

Further, although the axis conversion unit 220 performs axis conversion processing on the fourth spectral data, the axis conversion unit 220 may perform axis conversion processing on other spectral data. In other words, if the spectral data is the spectral data after the first compression processing by the first compression unit 217, the axis conversion unit 220 can perform the axis conversion. In this case, the frequency axes of the phase measurement and the amplitude characteristics may be the same when the filter generation unit 221 generates the filter.

Figure 9:
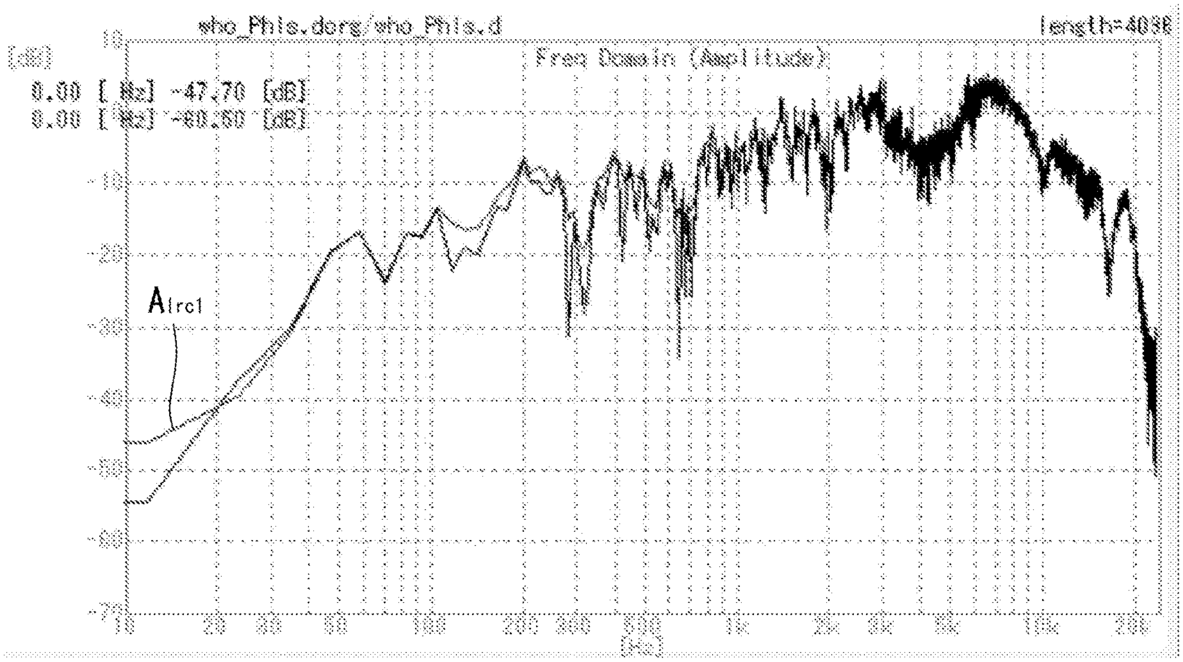
FIG. 9 is a graph showing spectral data compressed by the first compression processing.
Figure 10:
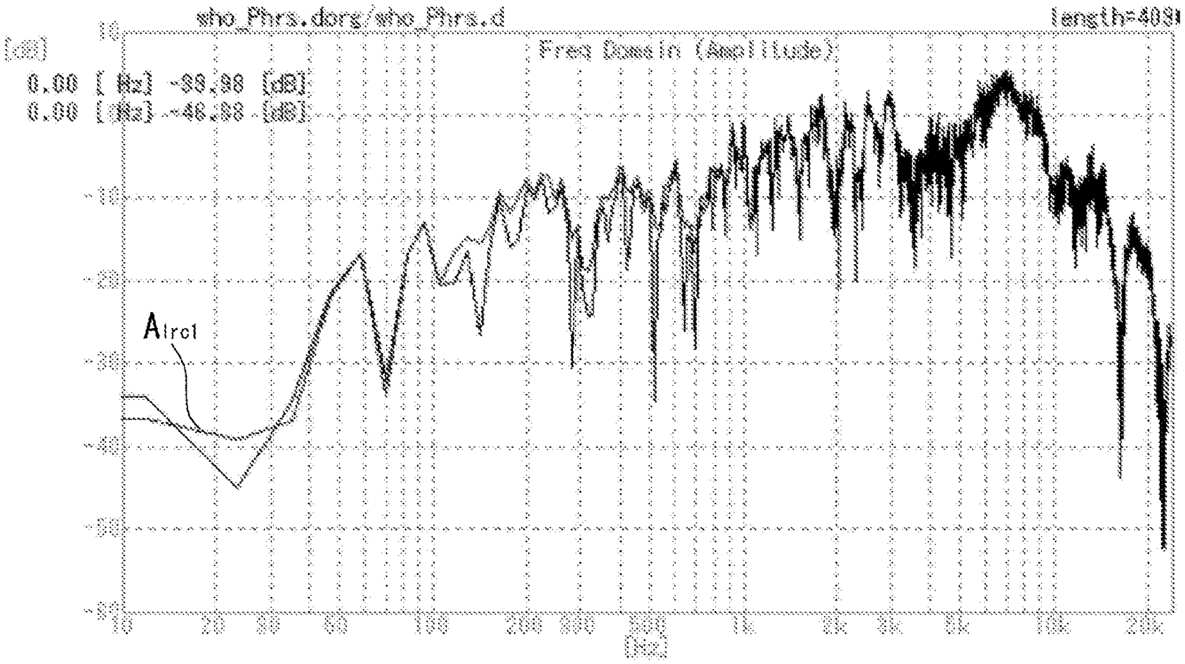
FIG. 10 is a graph showing spectral data compressed by the first compression processing.

FIGS. 9 to 12 are graphs showing spectral data obtained in the processing of an embodiment. FIG. 9 shows the result of performing the first compression processing on the spectral data of the sound pickup signal showing the spatial acoustic transfer characteristics Hls. FIG. 10 shows the result of performing the first compression processing on the spectral data of the sound pickup signal showing the spatial acoustic transfer characteristics Hrs. In FIGS. 9 and 10, the spectral data subjected to the first compression processing is shown as $A_{lrc1}$.

Figure 11:
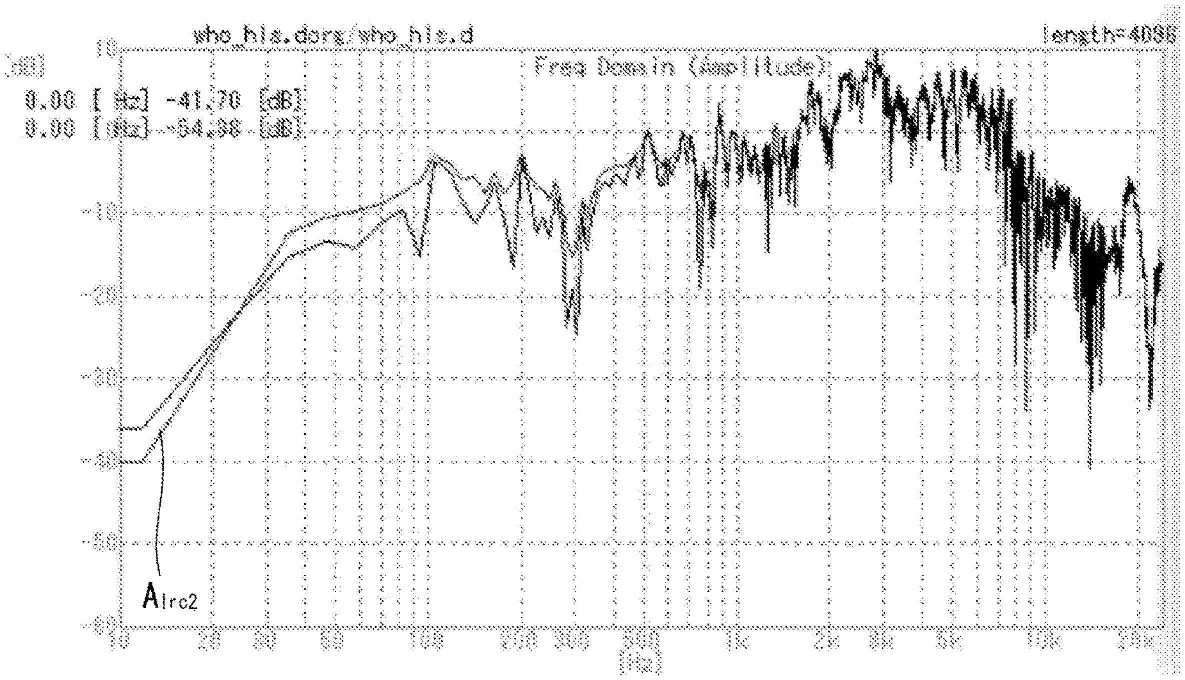
FIG. 11 is a graph showing spectral data compressed by the first compression processing.
Figure 12:
FIG. 12 is a graph showing spectral data compressed by the first compression processing.

FIG. 11 shows the results of performing the first compression processing and the second compression processing on the spectral data of the sound pickup signal showing the spatial acoustic transfer characteristics Hls. FIG. 12 shows the results of performing the first compression processing and the second compression processing on the spectral data of the sound pickup signal showing the spatial acoustic transfer characteristics Hrs. In FIGS. 11 and 12, the spectral data subjected to the first compression processing and the second compression processing are shown as $A_{lrc2}$. FIGS. 9 to 12 show the spectral data before compression for comparison. Specifically, the spectral data before smoothing is shown in FIGS. 9 to 12.

Second Embodiment

Figure 13:
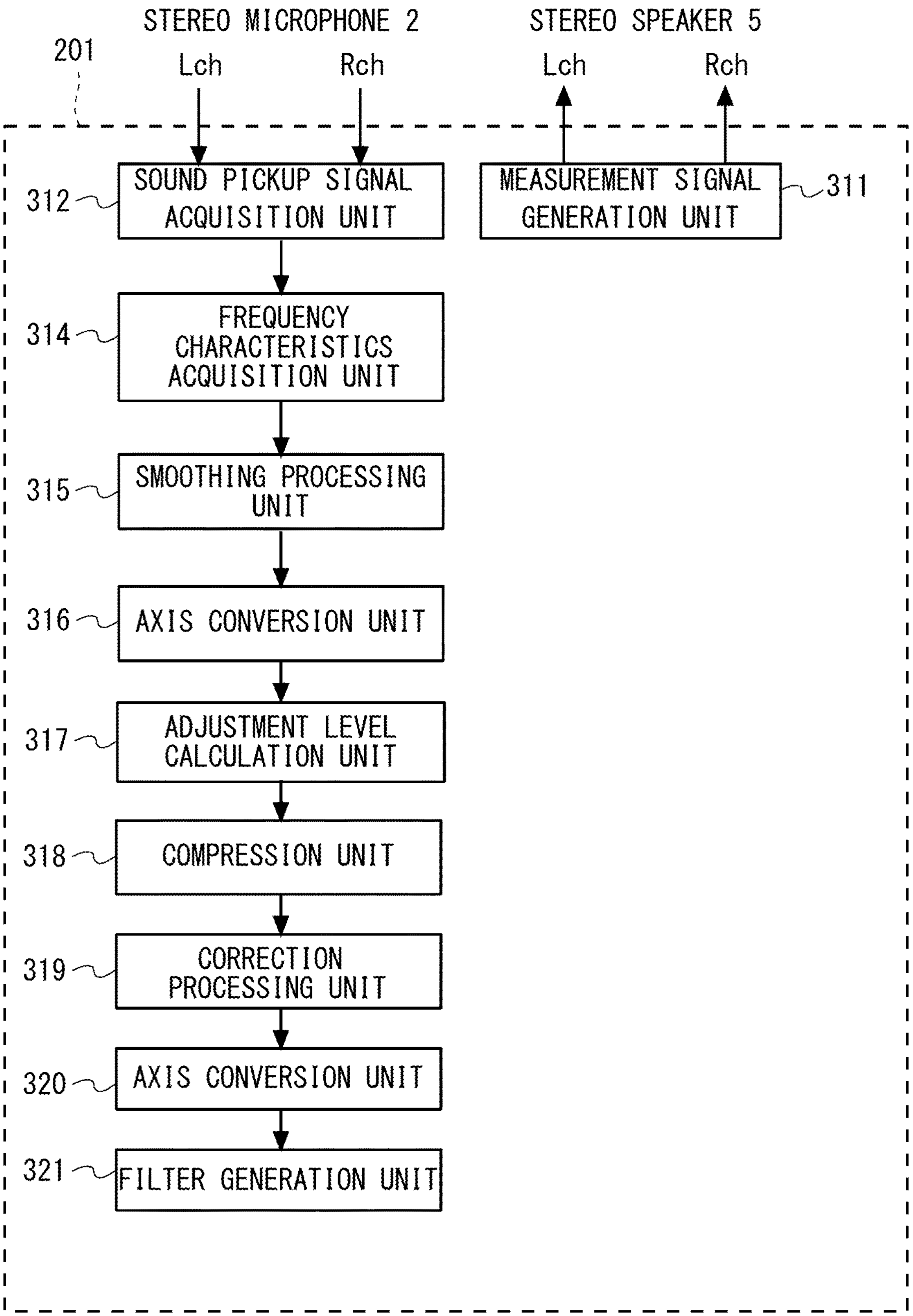
FIG. 13 is a block diagram showing a configuration of a processing device.

In a second embodiment, the configuration and processing in the processing device are different from those in the first embodiment. The configurations other than the processing device are the same as those of the first embodiment, and the description thereof will be omitted as appropriate. For example, the out-of-head localization processing device 100 and the measurement device 200 have the same device configurations as those shown in FIGS. 1 and 2. The processing device according to the second embodiment will be described with reference to FIG. 13. FIG. 13 is a block diagram showing the configuration of the processing device 201.

Hereinafter, the processing device 201 of the measurement device 200 and its processing will be described in detail. FIG. 13 is a control block diagram showing the processing device 201. The processing device 201 includes: a measurement signal generation unit 311; a sound pickup signal acquisition unit 312; a frequency characteristics acquisition unit 314; a smoothing processing unit 315; an axis conversion unit 316; an adjustment level calculation unit 317, a compression unit 318; a correction processing unit 319; an axis conversion unit 320; and a filter generation unit 321.

The measurement signal generation unit 311 includes a D/A converter, and an amplifier, and generates a measurement signal for measuring the ear canal transfer characteristics. The measurement signal is, for example, an impulse signal, or a TSP (Time Stretched Pulse) signal. Here, the measurement device 200 performs impulse response measurement, using the impulse sound as the measurement signal.

The left microphone 2L and the right microphone 2R of the microphone unit 2 each pick up the measurement signal and output the sound pickup signal to the processing device 201. The sound pickup signal acquisition unit 312 acquires the sound pickup signals picked up by the left microphone 2L and the right microphone 2R. Note that the sound pickup signal acquisition unit 312 may include an A/D converter that A/D-converts the sound pickup signals from the microphones 2L and 2R. The sound pickup signal acquisition unit 312 may synchronously add the signals obtained by a plurality of measurements.

The frequency characteristics acquisition unit 314 acquires frequency characteristic of the sound pickup signal. The frequency characteristics acquisition unit 314 calculates the frequency characteristics of the sound pickup signal by discrete Fourier transform or discrete cosine transform. The frequency characteristics acquisition unit 314 calculates the frequency characteristics, for example, by performing FFT (fast Fourier transform) on the sound pickup signal in the time domain. The frequency characteristics include an amplitude spectrum and a phase spectrum. Note that the frequency characteristics acquisition unit 314 may generate a power spectrum instead of the amplitude spectrum.

The smoothing processing unit 315 performs smoothing processing on the spectral data based on the frequency characteristics. The smoothing processing unit 315 smooths the spectral data by using a method such as a moving average, a Savitzky-Golay filter, a smoothing spline, a cepstrum transform, and a cepstrum envelope. The spectral data smoothed by the smoothing processing unit 315 is used as the smoothed spectral data. The smoothing processing unit 315 smooths the spectral data based on the frequency characteristics, to generate smoothed spectral data.

The axis conversion unit 316 converts the frequency axis of the smoothed spectral data by data interpolation. The axis conversion unit 316 changes the scale of the frequency-amplitude characteristics data so that the discrete spectral data are equally spaced on the logarithmic axis. The spectral data and smoothed spectrum data (hereinafter, also referred to as gain data) of the frequency-amplitude characteristics obtained by the frequency characteristics acquisition unit 314 are equally spaced in terms of frequency. In other words, the gain data are equally spaced on the linear frequency axis, and they therefore are not equally spaced on the logarithmic frequency axis. So, the axis conversion unit 316 performs interpolation processing on the gain data so that the gain data are equally spaced on the frequency logarithmic axis.

In the gain data, on the logarithmic axis, the lower the frequency range is, the more sparsely adjacent data are spaced, and the higher the frequency range is, the more densely the adjacent data are spaced. So, the axis conversion unit 316 interpolates the data in the low-frequency band in which the data are sparsely spaced. Specifically, the axis conversion unit 316 determines discrete gain data equally spaced on the logarithmic axis by performing interpolation processing such as three-dimensional spline interpolation. The gain data on which the axis conversion has been performed is referred to as the axis conversion data. The axis conversion data is a spectrum in which the frequencies and the amplitude values (gain values) correspond to each other. The axis conversion data is smoothed spectral data on which axis conversion has been performed.

The reason for converting the frequency axis to a log scale will be described. In general, it is said that the amount of sensitivity of a human is converted to logarithmic values. Therefore, it is important to consider the frequency of the audible sound on the logarithmic axis. The scale conversion causes the data to be equally spaced in the amount of sensitivity, and enables the data to be treated equivalently in all frequency bands. This facilitates mathematical calculation, frequency band division and weighting, thus enabling them to obtain stable results. Note that the axis conversion unit 316 is only required to convert envelope data to, without being limited to the log scale, a scale approximate to the auditory sense of a human (referred to as an auditory scale). The axis conversion is performed using an auditory scale such as a log scale, a mel scale, a Bark scale, an ERB (Equivalent Rectangular Bandwidth) scale.

The axis conversion unit 316 performs scale conversion on the gain data with an auditory scale by data interpolation. For example, the axis conversion unit 316 interpolates the data in the low-frequency band, in which the data are sparsely spaced on the auditory scale, to densify the data in the low-frequency band. The data equally spaced on the auditory scale are densely spaced in the low-frequency band and sparsely spaced in the high-frequency band on the linear scale. This enables the axis conversion unit 316 to generate axis conversion data equally spaced on the auditory scale. Of course, the axis conversion data does not need to be completely equally spaced data on the auditory scale.

The adjustment level calculation unit 317 calculates the adjustment level based on the smoothed spectral data in the third band B3. The adjustment level can be, for example, the average level of the smoothed spectral data in the third band B3. Specifically, the adjustment level calculation unit 317 calculates the sum of gains of the smoothed spectral data included in the third band B3. The adjustment level calculation unit 317 then divides the sum by the number of data included in the third band B3 to calculate the adjustment level.

Figure 14:
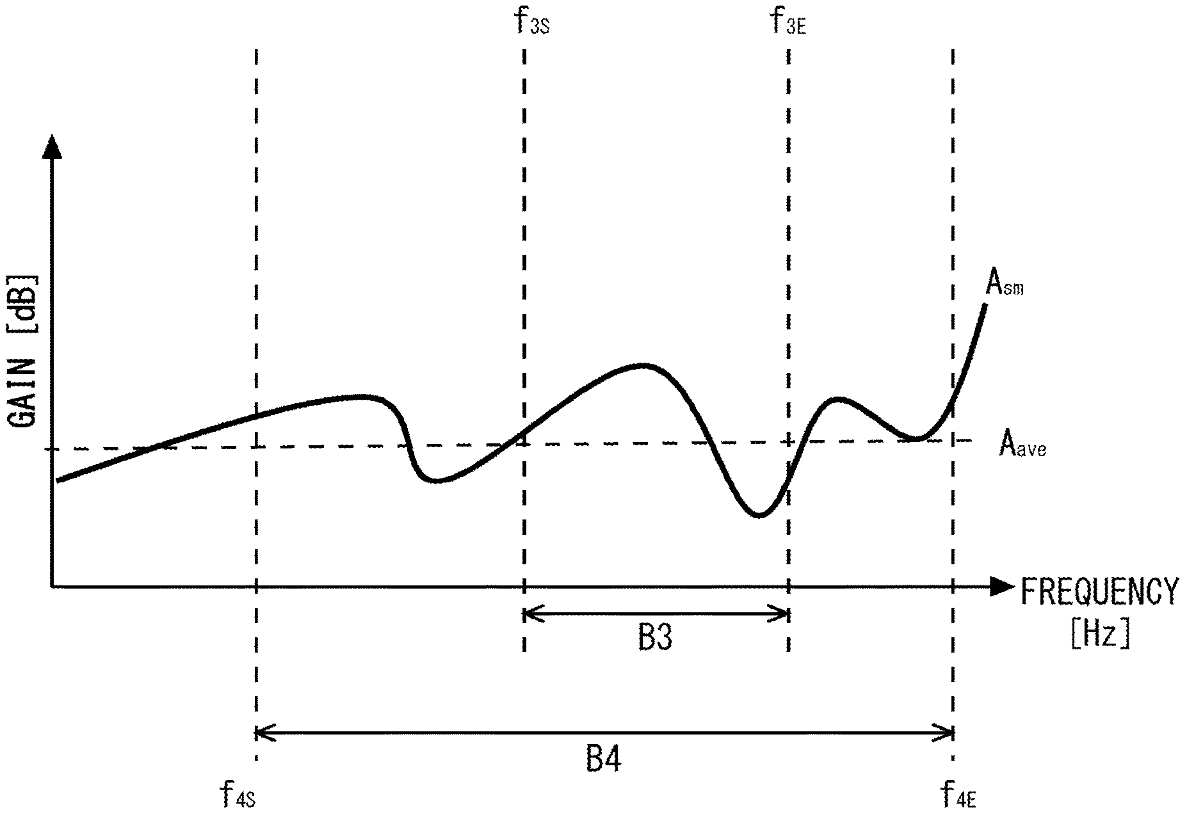
FIG. 14 is a graph showing an example of spectral data obtained from frequency-amplitude characteristics.

FIG. 14 shows an example of calculating the adjustment level. FIG. 14 is a graph schematically showing the smoothed spectral data $A_{sm}$ and the adjustment level $A_{ave}$. In FIG. 14, the horizontal axis is the frequency [Hz] and the vertical axis is the amplitude value (gain) [dB]. The smoothed spectral data $A_{sm}$ used here is the axis conversion data subjected to axis conversion by the axis conversion unit 316, but the axis conversion processing may be omitted. In other words, the average level of the smoothed spectral data $A_{sm}$ subjected to axis conversion becomes the adjustment level $A_{ave}$. For example, the adjustment level $A_{ave}$=3 dB. In other words, in the third band B3, the average value of the gain of the smoothed spectral data $A_{sm}$ is 3 dB.

The third band B3 can be, for example, 5 kHz to 10 kHz. In other words, the lower limit frequency $f_{3S}$ of the third band B3 is 5 kHz, and the upper limit frequency $f_{3E}$ thereof is 10 kHz. Note that, as will be described later, the average level may be the average value of the smoothed spectral data based on the sound pickup signals picked up by the left and right microphones 2L and 2R.

The compression unit 318 uses the adjustment level $A_{ave}$ to compress the smoothed spectral data in the fourth band B4. Note that the smoothed spectral data compressed by the compression unit 318 is used as compressed spectral data. For example, the compression unit 318 calculates a difference value obtained by subtracting the adjustment level $A_{ave}$ from the gain of the smoothed spectral data. Then, the compression unit 318 multiplies the difference value by a predetermined compression coefficient to calculate the compression value. The compression unit 318 subtracts the compression value from the gain of the smoothed spectral data in the fourth band B4. This generates the compressed spectral data.

Figure 15:
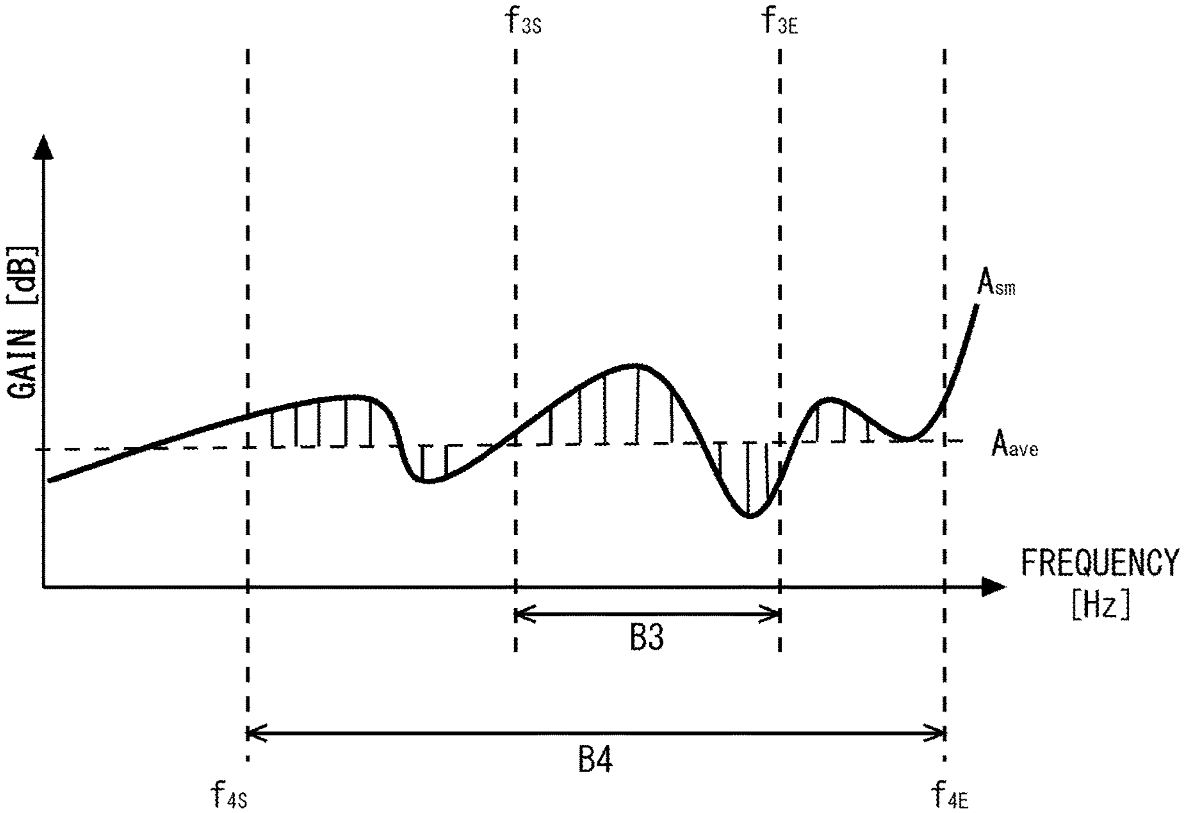
FIG. 15 is a diagram for explaining processing of compressing smoothed spectral data.

FIG. 15 is a graph for explaining the LRC processing in the compression unit 318. The compressed spectral data is $A_{lrc}$, the smoothed spectral data is $A_{sm}$ [dB], the adjustment level is $A_{ave}$ [dB], and the compression coefficient is lrcRate. The LRC processing in the compression unit 318 is represented by the following expression (6).

$$A_{lrc}=A_{sm}-\mathrm{lrcRate}*(A_{sm}-A_{ave}) \tag{6}$$

The compression unit 318 compresses the gain of the smoothed spectral data included in the fourth band B4 based on the expression (6). Because the smoothed spectral data $A_{sm}$ has a different gain value for each frequency, the compressed spectral data $A_{lrc}$ also has a different gain value for each frequency. The compression value (lrcRate*($A_{sm}$−$A_{ave}$)) is a different value for each frequency. The compression unit 318 calculates the gain value of the compressed spectral data $A_{lrc}$ for each frequency. In other words, the compression unit 318 compresses the smoothed spectral data with a compression value different for each frequency.

The compression coefficient lrcRate can be a constant value. For example, the compression coefficient lrcRate can be a value greater than 0 and less than or equal to 1. Here, the compression coefficient lrcRate=0.5. Adjustment level $A_{ave}$=3 [dB]. When $A_{sm}$=5 [dB], the compression value is 0.5*(5−3)=1 [dB], and the compressed spectral data $A_{lrc}$=5−1=4 [dB].

In this way, the compression unit 318 corrects the smoothed spectral data in the fourth band B4 so that the smoothed spectral data approaches the adjustment level $A_{ave}$. In other words, the compression unit 318 compresses the smoothed spectral data so that the smoothed spectral data approaches the adjustment level. This makes the compressed spectral data into a value between the smoothed spectral data and the adjustment level.

At a frequency in which the smoothed spectral data is greater than the adjustment level, the compressed spectral data becomes smaller than the smoothed spectral data. At a frequency in which the smoothed spectral data is smaller than the adjustment level, the compressed spectral data becomes greater than the smoothed spectral data. This can compress the smoothed spectral data while maintaining individual characteristics. In the fourth band B4, because the compression coefficient lrcRate is constant, the greater the difference value from the adjustment level, the greater the compression.

The fourth band B4 can be, for example, 1 kHz to 20 kHz. In other words, the lower limit frequency $f_{4S}$ of the fourth band B4 is 1 kHz, and the upper limit frequency $f_{4E}$ thereof is 20 kHz. Note that the third band B3 and the fourth band B4 are not limited to the above area. For example, the third band B3 can be a band in which a large amount of gain fluctuation in individual frequency characteristics appears in the fourth band B4. This allows the range of spectral data to be compressed without impairing the balance of individual characteristics possessed by an individual.

The fourth band B4 may be the same band as the third band B3 or may be a different band. The third band B3 and the fourth band B4 may be partially overlapping bands. The third band B3 may be a band included in the fourth band B4. The lower limit frequency $f_{3S}$ of the third band B3 can be set to be equal to or higher than the lower limit frequency $f_{4S}$ of the fourth band B4, and equal to or lower than the upper limit frequency $f_{4E}$ thereof. The upper limit frequency $f_{3E}$ of the third band B3 can be set to be equal to or higher than the lower limit frequency $f_{4S}$ of the fourth band B4 and equal to or lower than the upper limit frequency $f_{4E}$ thereof.

The correction processing unit 319 corrects the compressed spectral data so that the gain does not change abruptly around the fourth band B4 compressed by the compression unit 318. Specifically, the correction processing unit 319 corrects the gain of the compressed spectral data (smoothed spectral data) in the fifth band B5 and the sixth band B6.

Figure 16:
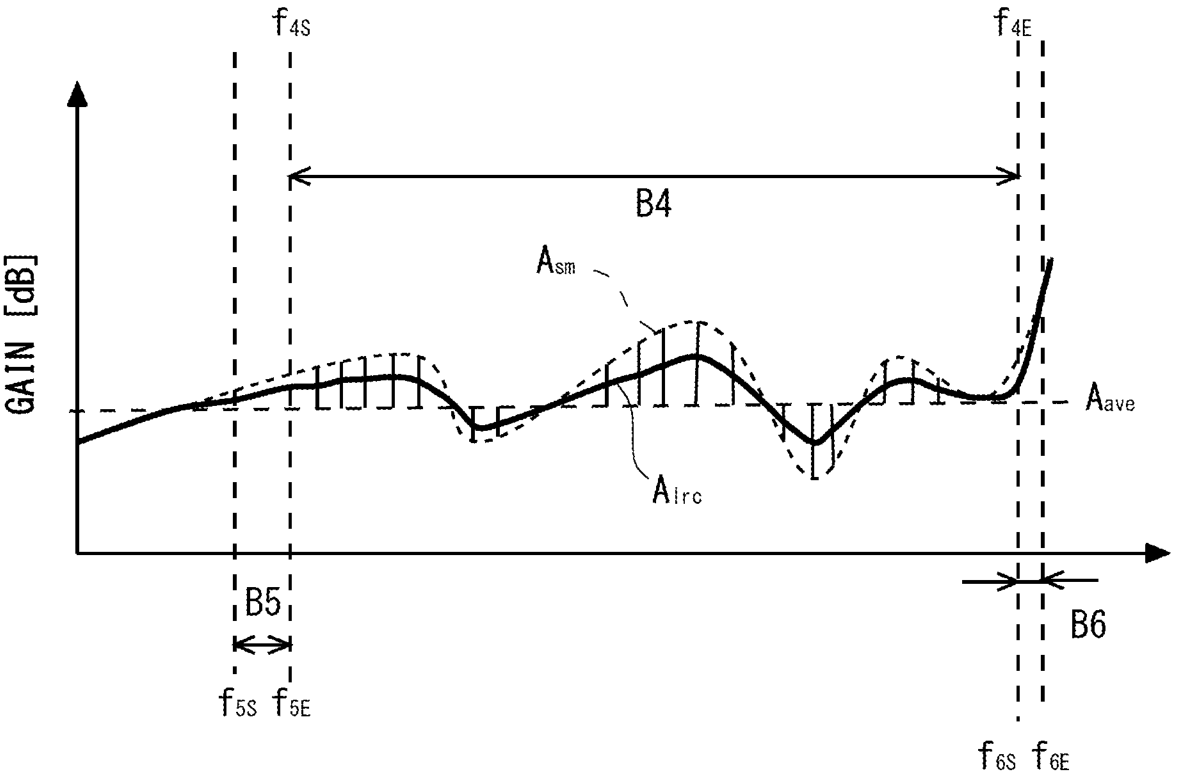
FIG. 16 is a diagram for explaining processing of correcting a fifth band and a sixth band.

As shown in FIG. 16, the fifth band B5 is an offset band on the low frequency side of the fourth band B4. The fifth band B5 is a band adjacent to the fourth band B4. The sixth band B6 is an offset band on the high frequency side of the fourth band B4. The sixth band B6 is a band adjacent to the fourth band B4.

For example, the fifth band B5 is 900 Hz to 1 kHz, and the sixth band B6 is 20 kHz to 21 kHz. The lower limit frequency $f_{5S}$ of the fifth band B5 is 900 Hz, and the upper limit frequency $f_{5E}$ thereof is 1 kHz. The upper limit frequency $f_{5E}$ of the fifth band B5 is the same as the lower limit frequency $f_{4S}$ of the fourth band B4. The lower limit frequency $f_{6S}$ of the sixth band B6 is 20 kHz and the upper limit frequency $f_{6E}$ thereof is 21 kHz. The lower limit frequency $f_{6S}$ of the sixth band B6 is the same as the upper limit frequency $f_{4E}$ of the fourth band B4.

The correction processing unit 319 corrects the smoothed spectral data of the fifth band B5. Specifically, the correction processing unit 319 corrects the gain of the fifth band B5 so that the gain does not change abruptly around the lower limit frequency $f_{4S}$ of the fourth band B4.

For example, the correction processing unit 319 corrects the gain so that the spectral data is smoothly connected between the lower limit frequency $f_{5S}$ and the upper limit frequency $f_{5E}$. The correction processing unit 319 interpolates between the lower limit frequency $f_{5S}$ and the upper limit frequency $f_{5E}$ with a curve such as a sine curve. Specifically, the correction processing unit 319 interpolates the gain of the fifth band B5 so that the gain at the lower limit frequency $f_{5S}$ and the gain at the upper limit frequency $f_{5E}$ are connected by a curve such as a sine function or a polynomial curve. Alternatively, the correction processing unit 319 may perform linear interpolation so that the gain at the lower limit frequency $f_{5S}$ and the gain at the upper limit frequency $f_{5E}$ are connected by a straight line. As a result, the correction processing unit 319 corrects the gain so that the gain gradually increases or gradually decreases from the lower limit frequency $f_{5S}$ toward the upper limit frequency $f_{5E}$.

Alternatively, the correction processing unit 319 may compress the fifth band B5 so that the compression coefficient lrcRate in the expression (6) gradually changes. In this case, the correction processing unit 319 compresses the smoothed spectral data by using a compression coefficient lrcRate that gradually increases from the lower limit frequency $f_{5S}$ toward the upper limit frequency $f_{5E}$. For example, when the compression coefficient at the lower limit frequency $f_{5S}$ is 0 and the compression coefficient at the upper limit frequency $f_{5E}$ is 0.5, the compression coefficient lrcRate is set so as to gradually increase from 0 to 0.5 from the lower limit frequency $f_{5S}$ toward the upper limit frequency $f_{5E}$.

The correction processing unit 319 corrects the gain so that the compression is gradually performed from the lower limit frequency $f_{5S}$ toward the upper limit frequency $f_{5E}$. In other words, the correction processing unit 319 corrects the gain so that compression gradually works less from the upper limit frequency $f_{5E}$ toward the lower limit frequency $f_{5S}$.

Likewise, the correction processing unit 319 corrects the smoothed spectral data of the sixth band B6. Specifically, the correction processing unit 319 corrects the gain of the sixth band B6 so that the gain does not change abruptly around the upper limit frequency $f_{4E}$ of the fourth band B4.

For example, the correction processing unit 319 corrects the gain so that the spectral data is smoothly connected between the lower limit frequency $f_{6S}$ and the upper limit frequency $f_{6E}$. The correction processing unit 319 interpolates between the lower limit frequency $f_{6S}$ and the upper limit frequency $f_{6E}$ with a straight line or a curve. This corrects the gain so that the gain gradually increases or gradually decreases from the lower limit frequency $f_{6S}$ toward the upper limit frequency $f_{6E}$.

Alternatively, the correction processing unit 319 may compress the sixth band B6 so that the compression coefficient lrcRate in the expression (6) gradually changes. In this case, the correction processing unit 319 compresses the smoothed spectral data by using a compression coefficient that gradually decreases from the lower limit frequency $f_{6S}$ toward the upper limit frequency $f_{6E}$. In this way, the correction processing unit 319 adjusts the gain so that the compression is gradually performed from the upper limit frequency $f_{6E}$ toward the lower limit frequency $f_{6S}$. In other words, the correction processing unit 319 corrects the gain so that compression gradually works less from the lower limit frequency $f_{6S}$ toward the upper limit frequency $f_{6E}$.

The spectral data corrected by the correction processing unit 319 is used as the corrected spectral data. The corrected spectral data of the fifth band B5 and the sixth band B6 are the data obtained by correcting the smoothed spectral data by the correction processing unit 319. The corrected spectral data of the fourth band B4 is the same data as the compressed spectral data. In other words, the corrected spectral data of the fourth band B4 is a gain value generated by the compression processing of the compression unit 318. In the band on the lower frequency side than the lower limit frequency $f_{5S}$ of the fifth band B5, the corrected spectral data is the same as the smoothed spectral data. In the band on the higher frequency side than the upper limit frequency $f_{6E}$ of the sixth band B6, the corrected spectral data is the same as the smoothed spectral data.

The axis conversion unit 320 performs axis conversion to convert the frequency axis of the corrected spectral data by data interpolation or the like. The processing in the axis conversion unit 320 is the opposite of the processing in the axis conversion unit 316. The axis conversion unit 320, which performs the axis conversion, returns the frequency axis of the corrected spectral data to the frequency axis before the axis conversion in the axis conversion unit 316. For example, the axis conversion unit 320 performs processing for returning the frequency axis converted to the log scale by the axis conversion unit 316, to the linear scale. The axis conversion unit 320 makes the corrected spectral data equally spaced on the linear frequency axis. This allows obtaining the frequency-amplitude characteristics of the same frequency axis as the frequency-phase characteristics acquired by the frequency characteristics acquisition unit 314. In other words, the frequency axes (data intervals) of the spectral data of the frequency-phase characteristics and the frequency-amplitude characteristics become the same.

The filter generation unit 321 generates a filter using the corrected spectral data subjected to axis conversion by the axis conversion unit 320. The filter generation unit 321 generates a filter to be applied to the reproduced signal based on the corrected spectral data. For example, the filter generation unit 321 calculates a signal in the time domain from the amplitude characteristics and the phase characteristics by inverse discrete Fourier transform or inverse discrete cosine transform. The filter generation unit 321 generates a temporal signal by performing IFFT (inverse fast Fourier transform) on the amplitude characteristics and the phase characteristics. The filter generation unit 321 calculates a spatial acoustic filter by cutting out the generated temporal signal with a specified filter length. The filter generation unit 321 may perform windowing to generate a spatial acoustic filter.

The filter generation unit 321 performs the above processing on the sound pickup signal obtained by picking up the measurement signal from the left speaker 5L with the left microphone 2L, and thereby generates a spatial acoustic filter corresponding to the spatial acoustic transfer characteristics Hls. The filter generation unit 321 performs the above processing on the sound pickup signal obtained by picking up the measurement signal from the left speaker 5L with the right microphone 2R, and thereby generates a spatial acoustic filter corresponding to the spatial acoustic transfer characteristics Hlo.

The filter generation unit 321 performs the above processing on the sound pickup signal obtained by picking up the measurement signal from the right speaker 5R with the left microphone 2L, and thereby generates a spatial acoustic filter corresponding to the spatial acoustic transfer characteristics Hro. The filter generation unit 321 performs the above processing on the sound pickup signal obtained by picking up the measurement signal from the right speaker 5R with the right microphone 2R, and thereby generates a spatial acoustic filter corresponding to the spatial acoustic transfer characteristics Hrs.

This can compress the frequency characteristics in a well-balanced manner. This can generate a filter suitable for localization of sound images. In other words, this can compress the frequency characteristics of the user while maintaining the individual characteristics. This can prevent an imbalance of sound image localization. This can localize well-balanced sound images. This can generate a filter tuned to a balanced sound quality; and this can make sound quality natural in terms of hearing feeling.

Note that the adjustment level calculation unit 317 may calculate the adjustment level from the spectral data based on the frequency characteristics of the sound pickup signals picked up by the left microphone 2L and the right microphone 2R. As shown in FIGS. 2, the left microphone 2L and the right microphone 2R measure the sound pickup signals. Thus, the sound pickup signal acquisition unit 312 acquires two sound pickup signals in one measurement. For example, when the measurement signal is output from the left speaker 5L, the sound pickup signal acquisition unit 312 acquires the sound pickup signal corresponding to the spatial acoustic transfer characteristics Hls and the sound pickup signal corresponding to the spatial acoustic transfer characteristics Hlo. Then, the adjustment level calculation unit 317 calculates the adjustment level common to the left and right from the smoothed spectral data of the two sound pickup signals.

The frequency characteristics acquisition unit 314 calculates the frequency characteristics of the two sound pickup signals. The smoothed spectral data of the sound pickup signal picked up by the left microphone 2L is referred to as $A_{smL}$, and the smoothed spectral data of the sound pickup signal picked up by the right microphone 2R is referred to as $A_{smR}$. The adjustment level obtained from the smoothed spectral data $A_{smL}$ is referred to as $A_{aveL}$, and the adjustment level obtained from the smoothed spectral data $A_{smR}$ is referred to as $A_{aveR}$. Here, the adjustment level $A_{aveL}$ is the average value of the smoothed spectral data $A_{smL}$ in the third band B3. The adjustment level $A_{aveR}$ is the average value of the smoothed spectral data $A_{smR}$ in the third band B3. Note that the adjustment level is not limited to the average value as long as a level that can be stably acquired can be calculated regardless of the frequency balance of individual characteristics. For example, the level may be a representative value such as a median value or a statistical value. The level may be a combination of statistical values such as a value obtained by adding an average value and a standard deviation.

The adjustment level calculation unit 317 calculates an entire adjustment level $A_{ave}$ from the left and right adjustment levels $A_{aveL}$ and $A_{aveR}$. For example, the adjustment level $A_{ave}$ common to the left and right is represented by the following expression (7).

$$A_{ave}=(A_{aveL}+A_{aveR})/2 \quad (7)$$

This causes the adjustment level for the spectral data based on the sound pickup signal of the left speaker 5L and the adjustment level for the spectral data based on the sound pickup signal of the right speaker 5R to be the same. This allows the fourth band B4 to be compressed more appropriately.

The LRC processing in the compression unit 318 is represented by the following expression (8) and (9), $$A_{lrcL}=A_{smL}-\text{lrcRate}*(A_{smL}-A_{ave}) \quad (8)$$

$$A_{lrcR}=A_{smR}-\text{lrcRate}*(A_{smR}-A_{ave}) \quad (9)$$

where: $A_{lrcL}$ is the compressed spectral data based on the sound pickup signal of the left microphone 2L; and $A_{lrcR}$ is the compressed spectral data obtained from the sound pickup signal of the right microphone 2R.

The filter generation unit 321 generates a filter corresponding to the spatial acoustic transfer characteristics Hls based on the compressed spectral data $A_{lrcL}$. The filter generation unit 321 generates a filter corresponding to the spatial acoustic transfer characteristics Hlo based on the compressed spectral data $A_{lrcR}$.

Likewise, for the measurement using the right speaker 5R, the adjustment level calculation unit 317 calculates the adjustment level common to the left and right. The filter generation unit 321 generates a filter corresponding to the spatial acoustic transfer characteristics Hro based on the compressed spectral data $A_{lrcL}$. The filter generation unit 321 generates a filter corresponding to the spatial acoustic transfer characteristics Hrs based on the compressed spectral data $A_{lrcR}$. In this way, the adjustment level calculation unit 317 calculates the adjustment level from the smoothed spectral data of the sound pickup signals picked up by the left microphone 2L and the right microphone 2R. Thus, the spectral data can be compressed with a more appropriate adjustment level. This can generate well-balanced filters.

Figure 17:
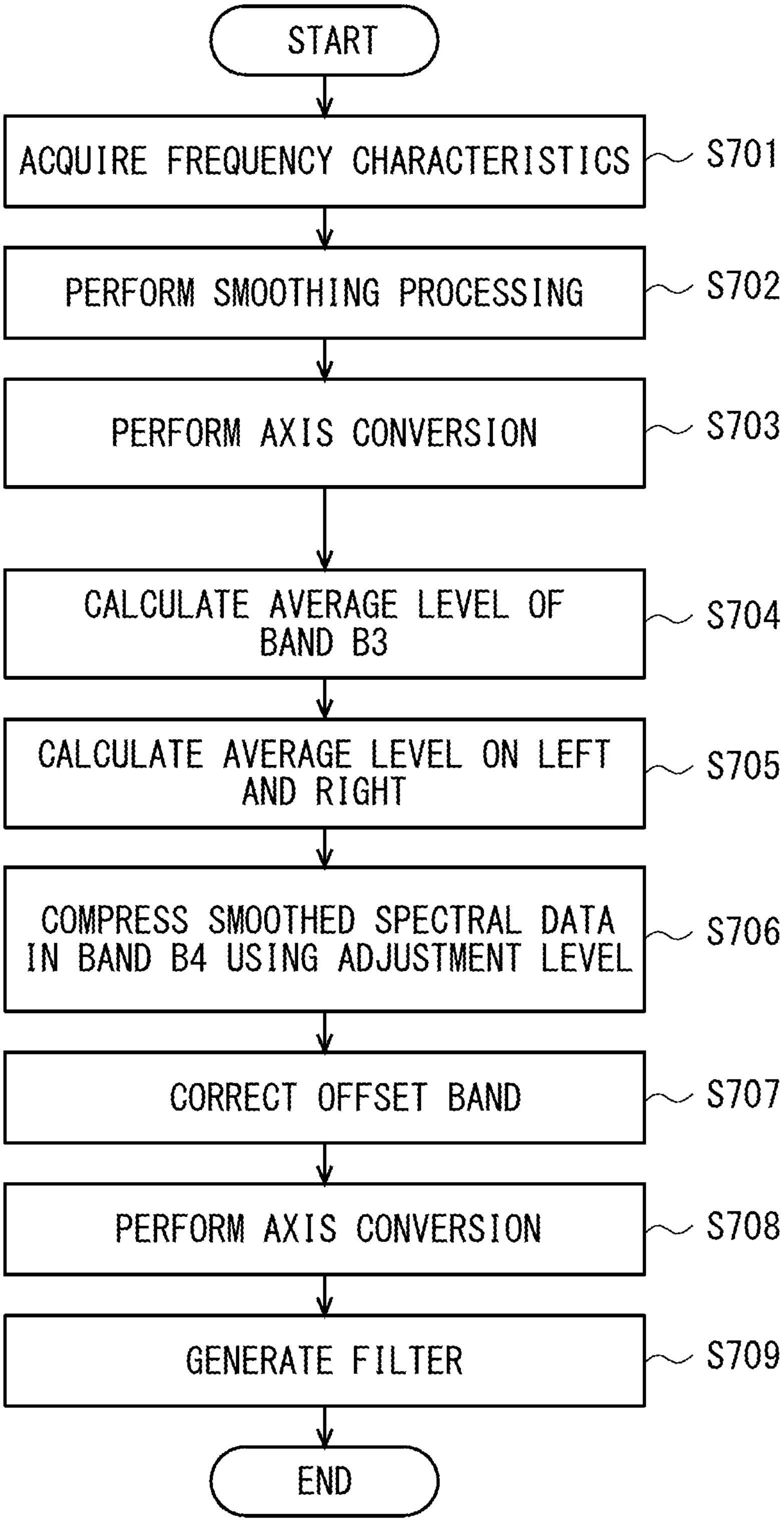
FIG. 17 is a flowchart illustrating a processing method according to an embodiment.

FIG. 17 is a flowchart showing a processing method according to this embodiment. First, the frequency characteristics acquisition unit 314 acquires the frequency characteristics of the sound pickup signal acquired by the sound pickup signal acquisition unit 312 (S701). For example, the sound pickup signal in the time domain is converted into the frequency domain by FFT or the like. Next, the smoothing processing unit 315 performs smoothing processing on the spectral data (S702). As a result, smoothed spectral data can be obtained.

The axis conversion unit 316 performs axis conversion on the smoothed spectral data (S703). This allows obtaining spectral data obtained by converting the frequency axis of the sound pickup signal into a logarithmic axis. Note that the axis conversion processing by the axis conversion unit 316 can be omitted. In this case, the axis conversion processing by the axis conversion unit 320, which will be described later, is also unnecessary.

Next, the adjustment level calculation unit 317 calculates the average levels of the third band B3 in the left and right smoothed spectral data (S704). This allows obtaining the left and right adjustment levels $A_{aveL}$ and $A_{aveR}$. Next, the adjustment level calculation unit 317 calculates the average level on the left and right as the adjustment level $A_{ave}$ (S705). This allows the adjustment level calculation unit 317 to obtain the adjustment level $A_{ave}$ common to the left and right. Note that, when different adjustment levels are used on the left and right, the processing of step S705 can be omitted.

Next, the compression unit 318 compresses the smoothed spectral data of the fourth band B4 using the adjustment level (S706). Specifically, the compression unit 318 generates compressed spectral data based on the above expressions (8) and (9).

The correction processing unit 319 corrects the offset band (S707). In other words, the correction processing unit 319 corrects the compressed spectral data of the fifth band B5 and the sixth band B6. As a result, corrected spectral data can be obtained. The axis conversion unit 320 performs axis conversion of the corrected spectral data (S708). The filter generation unit 321 generates a filter based on the corrected spectral data after the axis conversion (S709). This generates spatial acoustic filters corresponding to the spatial acoustic transfer characteristics Hls and Hlo or spatial acoustic filters corresponding to the spatial acoustic transfer characteristics Hro and Hrs. This can generate well-balanced filters.

Further, in the first and second embodiments, the processing device 201 processes the spectral data of the sound pickup signals indicating the spatial acoustic transfer characteristics Hls, Hlo, Hro, and Hrs, but it may process spectral data of the sound pickup signals indicating the ear canal transfer characteristics. Further, the processing device 201 generates the out-of-head localization processing filters, but it may generate other filters. Thus, using the filters generated by the processing method according to this embodiment allows sound images to be localized in a well-balanced manner.

The out-of-head localization processing device 100 is not limited to a physically single device, but may be distributed to a plurality of devices connected via a network or the like. In other words, the out-of-head localization processing method according to this embodiment may be carried out by a plurality of devices in a distributed manner.

The out-of-head localization processing device 100 is not limited to a physically single device, but may be distributed to a plurality of devices connected via a network or the like. In other words, the out-of-head localization processing method according to this embodiment may be carried out by a plurality of devices in a distributed manner.

A part or the whole of the above-described processing may be executed by a computer program. The program includes a set of instructions (or software code) for causing the computer to execute one or more of the functions described in the embodiments when loaded into the computer. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A processing device comprising:

a processor coupled to a memory storing instructions to permit the processor to function as:

a frequency characteristics acquisition unit configured to acquire frequency characteristics of at least one sound pickup signal;

a smoothing processing unit configured to smooth spectral data that are based on the frequency characteristics to generate smoothed spectral data;

a compression unit configured to compress the smoothed spectral data, using a predetermined value, to generate compressed spectral data; and a filter generation unit configured to generate a filter, based on the spectral data compressed by the compression unit, wherein the smoothing processing unit performs smoothing processing so as to generate second spectral data smoother than first spectral data, the first spectral data being based on the frequency characteristics, wherein the compression unit includes a first compression unit configured to:

calculate a first difference value corresponding to a difference between the second spectral data and the first spectral data in a first band; and compress, based on the first difference value, the second spectral data, wherein the filter generation unit further generates the filter, based on the second spectral data compressed by the compression unit, wherein the compression unit further includes a second compression unit configured to:

calculate a second difference value corresponding to a difference between third spectral data generated by first compression processing in the first compression unit and a predetermined reference value in a gain of spectral data; and compress the third spectral data, based on the second difference value, and wherein the filter comprises a spatial acoustic filter, corresponding to spatial acoustic transfer characteristics, for improving sound quality.

2. The processing device according to claim 1, wherein first compression processing by the first compression unit and second compression processing by the second compression unit are alternately performed.

3. The processing device according to claim 1, further comprising:

a first axis conversion unit configured to convert a frequency axis of the first spectral data, by data interpolation, and a second axis conversion unit configured to convert, by data interpolation, a frequency axis of spectral data after being compressed by the first compression unit, wherein the filter generation unit generates the filter, based on spectral data subjected to axis conversion in the second axis conversion unit.

4. The processing device according to claim 1, further comprising:

an adjustment level calculation unit configured to calculate an adjustment level, based on the smoothed spectral data in a first band, wherein a third compression unit: compresses the smoothed spectral data in a third band, using the adjustment level; and thereby generates the compressed spectral data.

5. The processing device according to claim 4, further comprising:

a first axis conversion unit configured to convert, by data interpolation, a frequency axis of the smoothed spectral data; and a second axis conversion unit configured to convert, by data interpolation, a frequency axis of the compressed spectral data, wherein the filter generation unit generates the filter, based on fourth spectral data subjected to axis conversion in the second axis conversion unit.

6. The processing device according to claim 4, further comprising a correction processing unit configured to correct the compressed spectral data, in offset bands provided on a high frequency side and a low frequency side of the third band so that gain on each side does not change abruptly.

7. The processing device according to claim 4, wherein the sound pickup signals are picked up using microphones respectively worn on left and right ears of a person being measured, and the adjustment level calculation unit calculates the adjustment level, from the smoothed spectral data of the sound pickup signals picked up by the left and right microphones.

8. A processing method comprising:

acquiring frequency characteristics of an input signal;

performing a smoothing processing so as to generate second spectral data smoother than first spectral data, the first spectral data being based on the frequency characteristics;

calculating a first difference value corresponding to a difference between the second spectral data and the first spectral data in a first band;

a first compressing, based on the first difference value, the second spectral data;

generating a filter, based on compressed second spectral data; and a second compressing including:

calculating a second difference value corresponding to a difference between third spectral data generated by first compressing and a predetermined reference value in a gain of spectral data; and compressing the third spectral data, based on the second difference value, and wherein the filter comprises a spatial acoustic filter, corresponding to spatial acoustic transfer characteristics, for improving sound quality.

* * * * *